(12) United States Patent
Griggs, Jr.

(10) Patent No.: US 11,193,519 B2
(45) Date of Patent: Dec. 7, 2021

(54) CAM ASSEMBLY WITH INTERLOCKING PARTS FOR FURNITURE

(71) Applicant: Billy Joe Griggs, Jr., Pulaski, TN (US)

(72) Inventor: Billy Joe Griggs, Jr., Pulaski, TN (US)

( * ) Notice: Subject to any disclaimer, the term of this patent is extended or adjusted under 35 U.S.C. 154(b) by 1045 days.

(21) Appl. No.: 15/690,151

(22) Filed: Aug. 29, 2017

(65) Prior Publication Data
US 2017/0363126 A1 Dec. 21, 2017

Related U.S. Application Data

(63) Continuation-in-part of application No. 15/343,563, filed on Nov. 4, 2016, now abandoned, which is a continuation-in-part of application No. 15/049,767, filed on Feb. 22, 2016, now Pat. No. 10,302,116, which is a continuation of application No. 14/167,249, filed on Jan. 29, 2014, now Pat. No. 9,265,347.

(60) Provisional application No. 61/758,231, filed on Jan. 29, 2013, provisional application No. 62/380,932, filed on Aug. 29, 2016, provisional application No. 62/490,226, filed on Apr. 26, 2017.

(51) Int. Cl.
*A47C 3/027* (2006.01)
*F16B 12/40* (2006.01)
*A47C 1/02* (2006.01)
*F16B 12/10* (2006.01)

(52) U.S. Cl.
CPC .............. *F16B 12/40* (2013.01); *A47C 1/02* (2013.01); *A47C 3/027* (2013.01); *F16B 12/10* (2013.01); *Y10T 29/49826* (2015.01)

(58) Field of Classification Search
CPC ........... A47C 1/02; A47C 1/035; A47C 3/027; A47C 4/02; A47C 4/028; A47C 7/42
See application file for complete search history.

(56) References Cited

U.S. PATENT DOCUMENTS

| | | | | |
|---|---|---|---|---|
| 3,547,393 A | * | 12/1970 | Gordin | A47C 3/18 248/582 |
| 3,881,713 A | * | 5/1975 | Joyce | F16F 1/12 267/131 |
| 4,025,020 A | * | 5/1977 | Goff | A47C 3/025 248/582 |
| 4,079,991 A | * | 3/1978 | Harris | A47C 3/029 297/133 |
| 5,564,781 A | * | 10/1996 | Pine | A47C 3/027 297/267.1 |
| 5,702,152 A | * | 12/1997 | Shaw | A47C 3/029 297/133 |
| 5,833,307 A | * | 11/1998 | Leach | A47C 3/029 297/133 |
| 5,839,781 A | * | 11/1998 | Knape | A47C 3/029 297/258.1 |
| 6,000,754 A | * | 12/1999 | Lawson | A47C 1/0355 297/259.2 |

(Continued)

*Primary Examiner* — Daniel J Wiley
(74) *Attorney, Agent, or Firm* — Wayne Edward Ramage; Baker Donelson

(57) ABSTRACT

A mechanism and method for assembling a base to a piece of furniture is provided with at least two cam pieces having complimentary interlock mechanisms constructed and arranged to interlock one to another to form a cam. A plurality of interlock mechanisms may be provided, as well as a plurality of positioning elements on respective cam pieces.

14 Claims, 29 Drawing Sheets

(56) References Cited

U.S. PATENT DOCUMENTS

| | | | | |
|---|---|---|---|---|
| 6,061,891 A * | 5/2000 | Hoffman | A47C 3/027 29/436 |
| 6,241,317 B1 * | 6/2001 | Wu | A47C 4/02 297/440.1 |
| 6,416,123 B1 * | 7/2002 | Bell | A47C 3/029 297/133 |
| 6,439,656 B1 * | 8/2002 | Liu | A47C 3/029 297/271.6 |
| 7,628,452 B2 * | 12/2009 | Du | A47C 3/027 297/259.2 |
| 7,962,975 B2 * | 6/2011 | Hartline | A47C 17/225 5/51.1 |
| 8,974,139 B2 * | 3/2015 | Saul | A47C 4/02 403/331 |
| 9,504,329 B2 * | 11/2016 | Adams, IV | A47C 3/029 |
| 2002/0149238 A1 * | 10/2002 | Hoffman | A47C 3/18 297/85 R |
| 2011/0148162 A1 * | 6/2011 | Huang | A47C 4/03 297/271.6 |
| 2011/0215630 A1 * | 9/2011 | Grove | A47C 7/42 297/440.1 |
| 2014/0239679 A1 * | 8/2014 | Griggs, Jr. | A47C 7/02 297/183.1 |

* cited by examiner

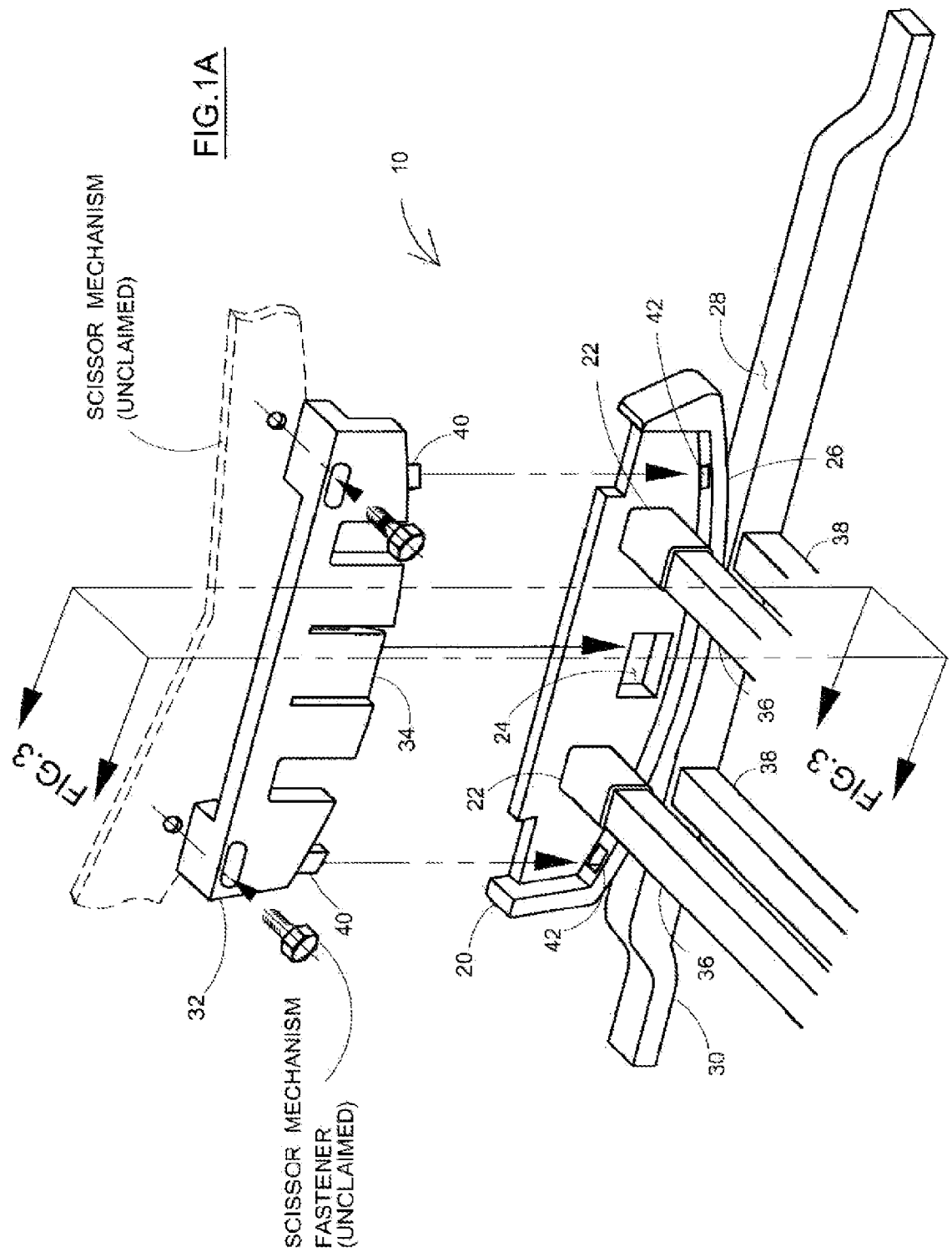

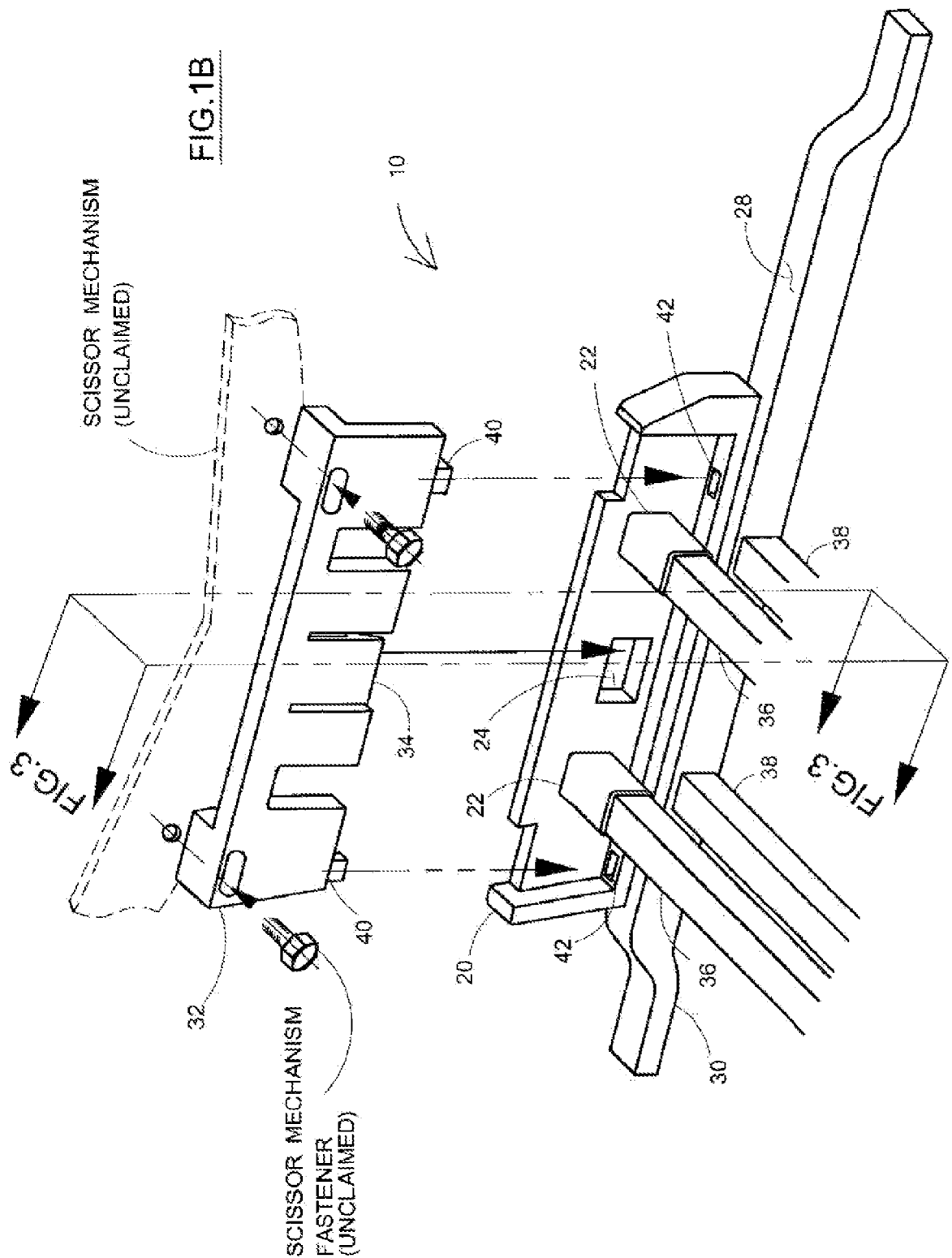

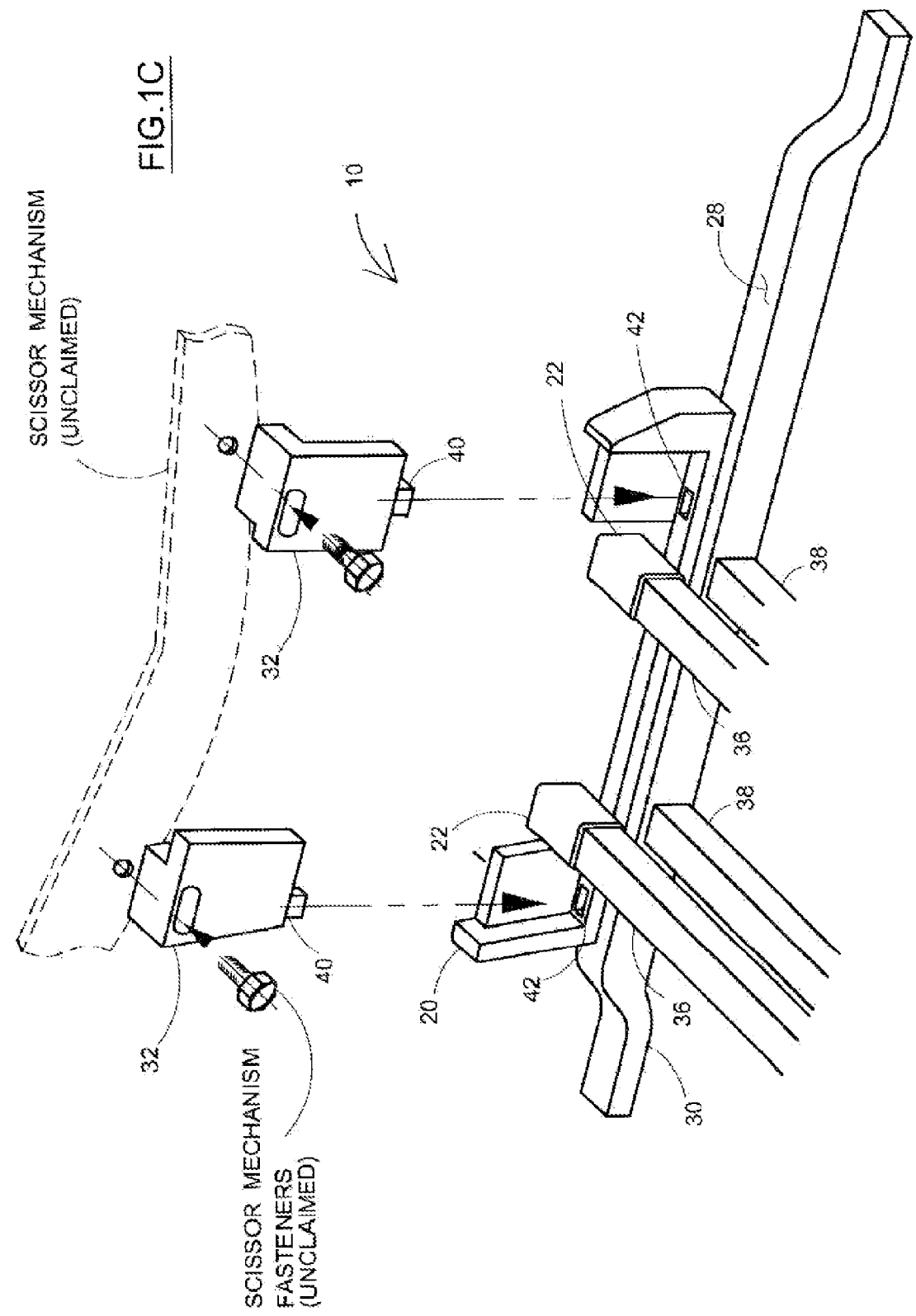

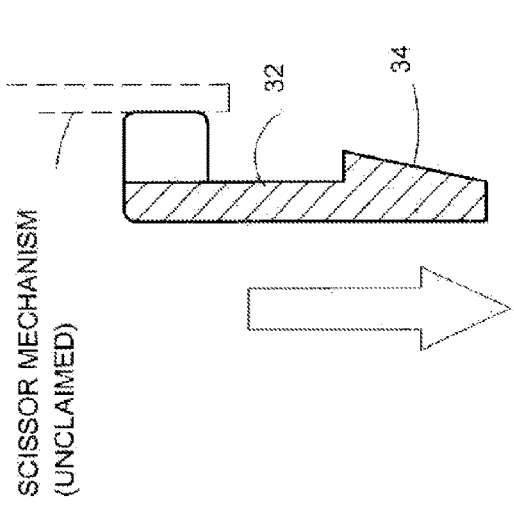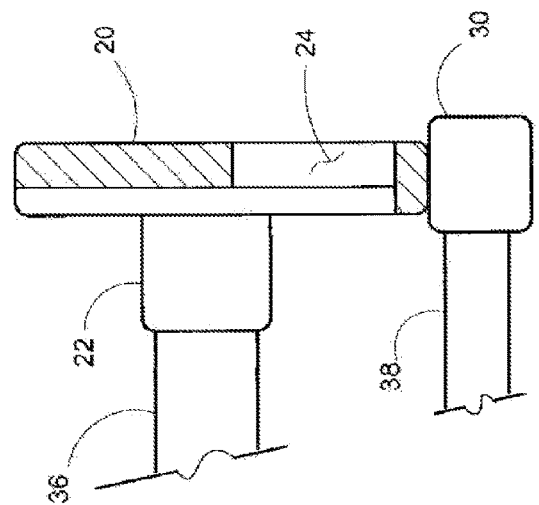
FIG. 3
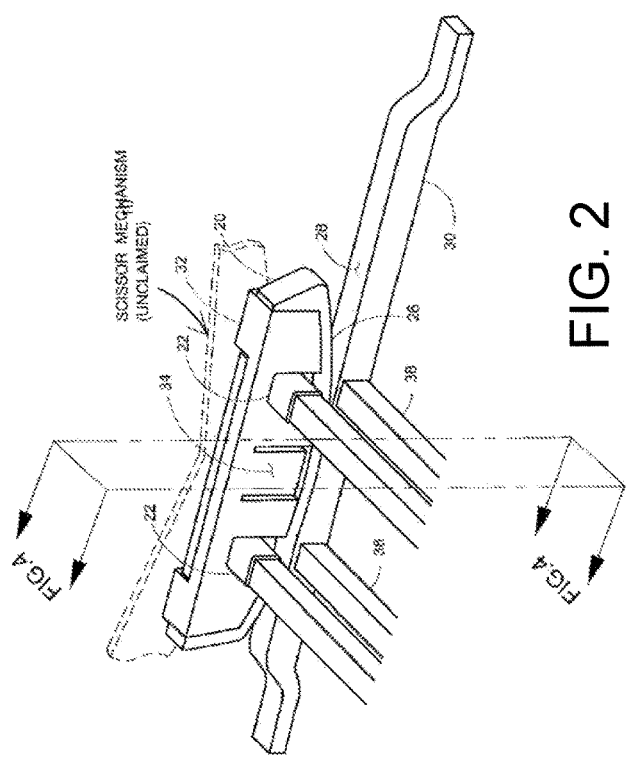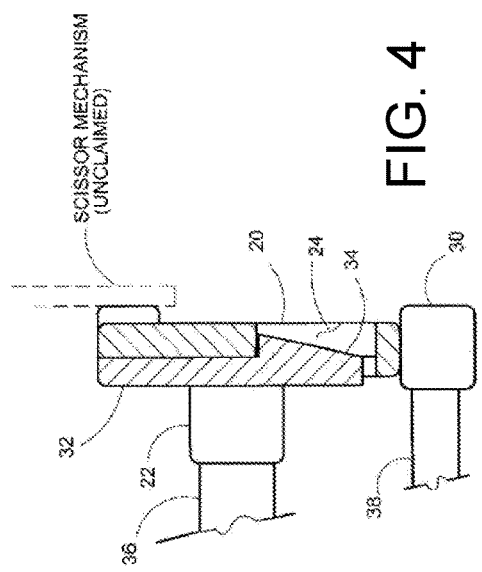
FIG. 2
FIG. 4

CAM ASSEMBLY WITH INTERLOCKING PARTS FOR FURNITURE

This application is a continuation-in-part application of U.S. application Ser. No. 15/343,563, filed Nov. 4, 2016, which is a continuation-in-part application of U.S. application Ser. No. 15/049,767, filed Feb. 22, 2016, which is a continuation of U.S. application Ser. No. 14/167,249, filed Jan. 29, 2014, which claims benefit of and priority to U.S. Provisional Application No. 61/758,231, filed Jan. 29, 2013, by Billy Joe Griggs Jr., and is entitled to those filing dates for priority. This application also claims priority to and benefit of U.S. Provisional Application No. 62/380,932, filed Aug. 29, 2016, and U.S. Provisional Application No. 62/490,226, filed Apr. 26, 2017, and is entitled to those filing dates for priority. The specifications, figures, appendices and complete disclosures of U.S. Provisional Applications Nos. 61/758,231; 62/380,932; and 62/490,226; and U.S. application Ser. Nos. 14/167,249; 15/049,767; and 15/343,563 are incorporated herein in their entireties by specific reference for all purposes.

FIELD OF INVENTION

This invention relates to a mechanism and system for a cam assembly for connecting parts for furniture.

BACKGROUND OF THE INVENTION

Ready to assemble furniture is very popular because it can be easier to assemble and relatively inexpensive as compared to fully assembled furniture. However, there are pieces of furniture that have been proven to be exceedingly difficult to provide as ready to assemble furniture.

Reclining furniture with rocker, glider, swivel and other mechanisms create particular problems when used in ready to assemble furniture. In fact the precision of preparing the interlocking parts is typically beyond the ability of the average person working with ready to assemble furniture. The present invention addresses this deficiency and provides a novel interlocking cam assembly whereby the interlocking cams are provided to allow for easier assembly of reclining and motion furniture. The multi-piece cam further provides a configuration that is more easily disassembled and serviced in the field.

SUMMARY OF INVENTION

In various embodiments, the present invention comprises a mechanism for assembling and connecting a furniture base to a piece of furniture. The assembly comprises a furniture base having a first cam piece, configured with a first cam interlock, associated therewith; a furniture frame having a second cam piece, configured with a second cam interlock, associated therewith; with each of said first cam and second cam interlocks configured to mate and interlock one to another to form a cam.

The mechanism is configured to be used with a multitude of furniture bases including, but not limited to recliner mechanism bases, rockers, gliders, swivels, swivel rockers, swivel gliders, twin sleepers, full sleepers, queen sleepers, king sleepers, or combinations thereof.

In one embodiment, the first cam piece is a system including two or more cam units or sub-pieces. In another embodiment, the second cam piece is a system including two or more cam units or sub-pieces. The first cam piece may have two or more first cam interlocks, and the second cam piece may have two or more second cam interlocks.

In one exemplary embodiment, the first cam interlock is integrated onto said first cam piece. Similarly, the second cam interlock may be integrated onto said second cam piece. In several embodiments, the first cam interlock and said first cam piece are constructed of a unitary piece. The second cam interlock and said second cam piece also may be constructed of a unitary piece. The first cam interlock and said second cam interlock connect in a snap-fit locking arrangement.

The present invention further contemplates a method of connecting a furniture base to furniture, said method comprising the steps of: providing a first cam piece and second cam piece according to any of the configurations or combinations disclosed herein; associating said first cam piece with a furniture base; connecting said second cam piece to either a furniture seat box or a reclining mechanism; positioning said first and second cam pieces to align respective interlocks; and interlocking each of said first and second cam pieces one to another to form a cam.

BRIEF DESCRIPTION OF THE DRAWINGS

FIG. 1A is a side perspective view of a two-piece cam assembly configuration in a separated position.

FIG. 1B is a side perspective view of a two-piece cam assembly configuration in a separated position.

FIG. 1C is a side perspective view of a four-piece cam assembly configuration in a separated position.

FIG. 2 is a side perspective view of a two-piece cam assembly configuration in a connected position.

FIG. 3 is a partial cross-section from FIGS. 1A and 1B with directional arrow indicating direction of connection of separate cam components.

FIG. 4 is a partial cross-section from FIGS. 1A, 1B, and 3 with separate cam components in a connected position.

DETAILED DESCRIPTION OF EXEMPLARY EMBODIMENTS

Figure 5:
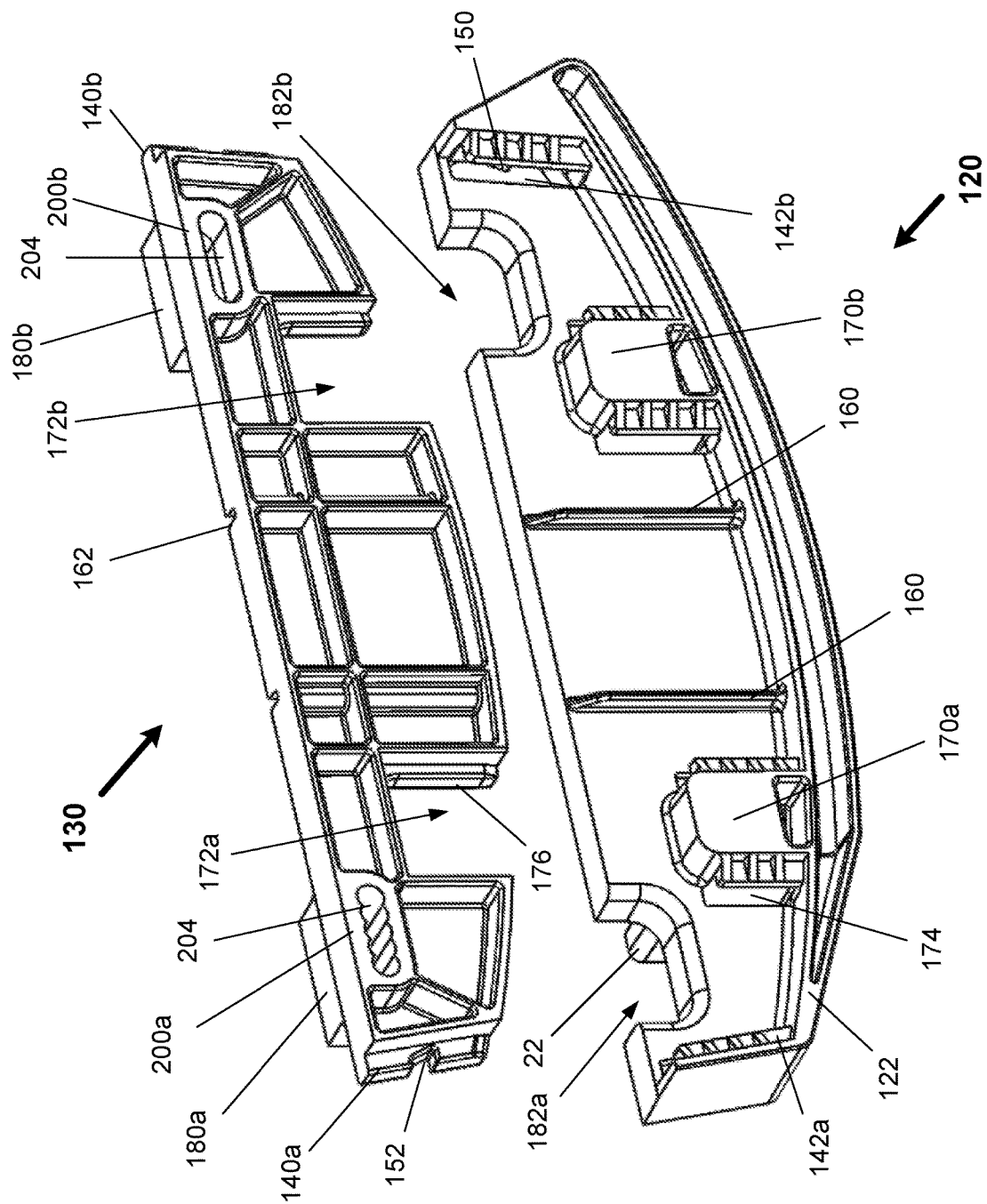
FIG. 5 is a side perspective view of another example of a two-piece cam assembly configuration in a separated position.
Figure 6:
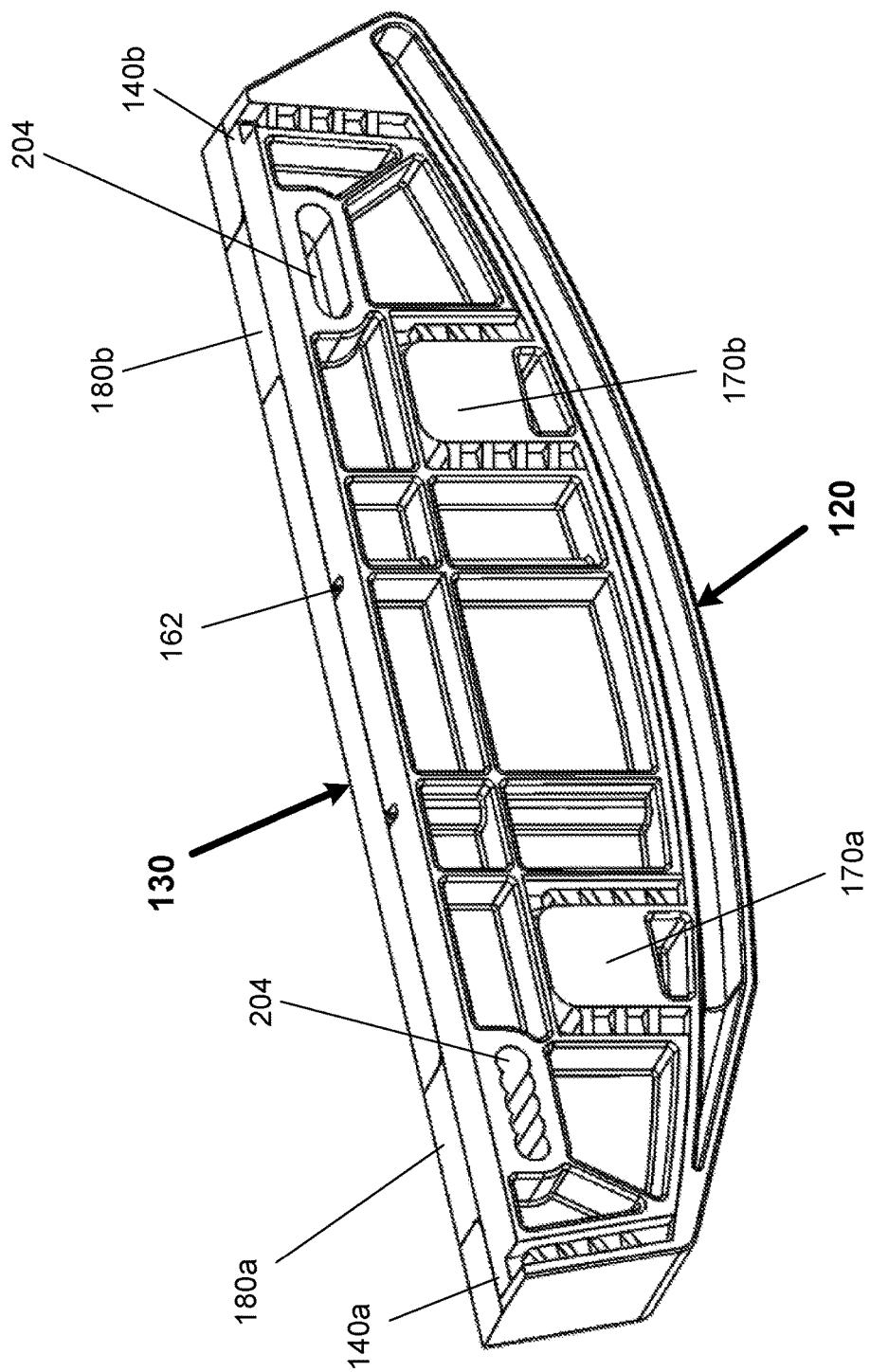
FIG. 6 is a side perspective view of the assembly of FIG. 5 in a connected position.
Figure 7:
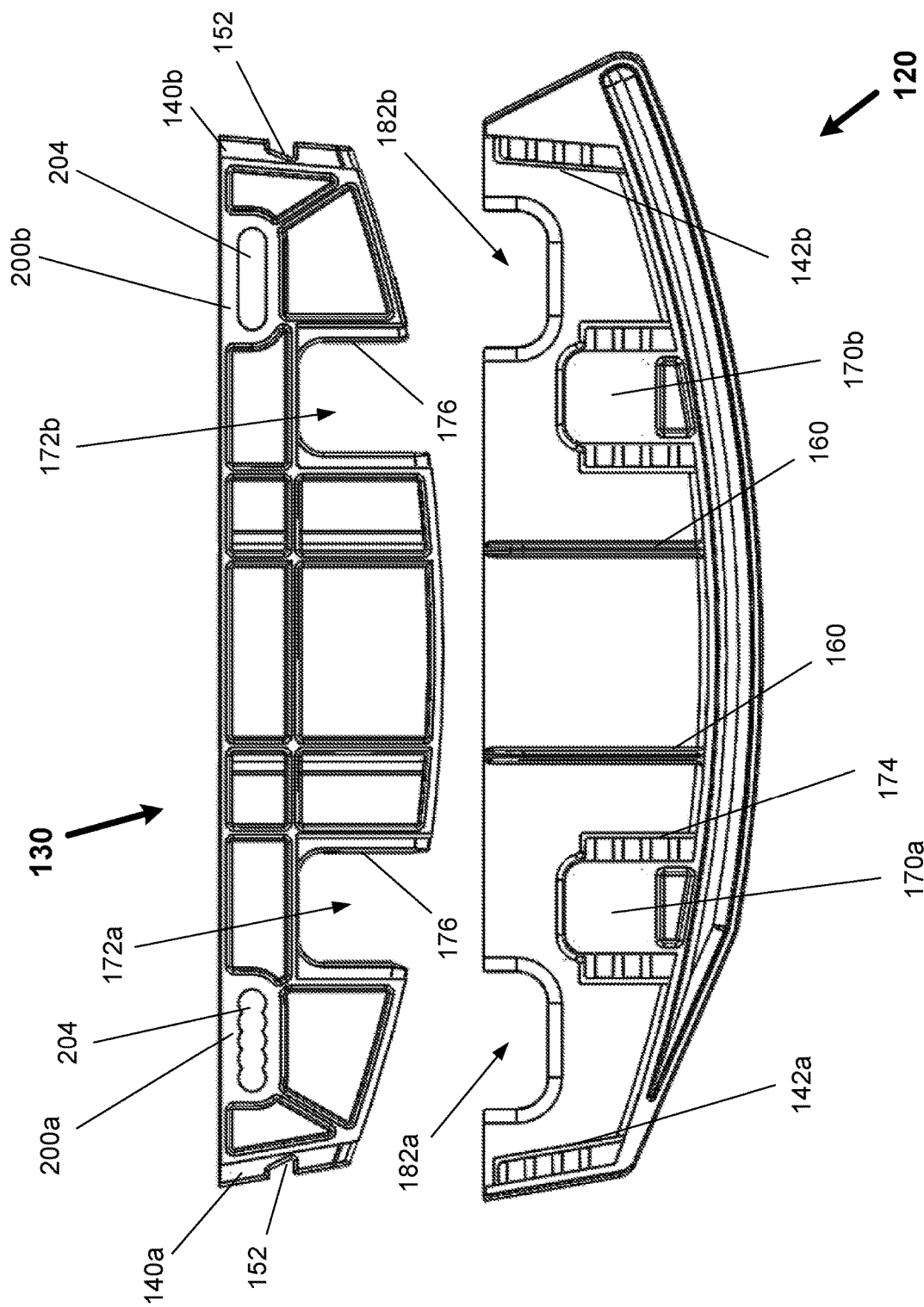
FIG. 7 is an outer side view of the assembly of FIG. 5 in a separated position
Figure 8:
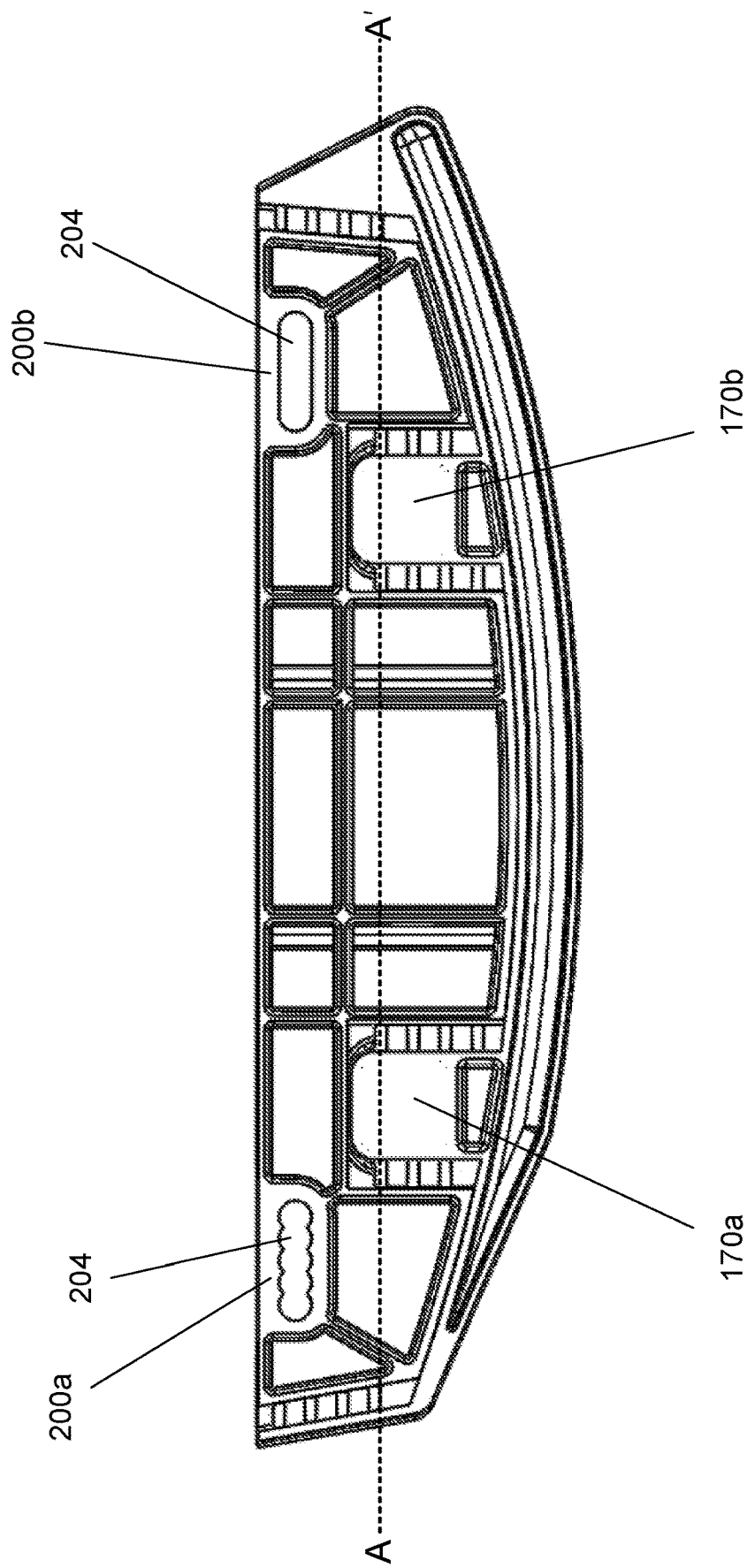
FIG. 8 is an outer side view of the assembly of FIG. 5 in a connected position.
Figure 9:
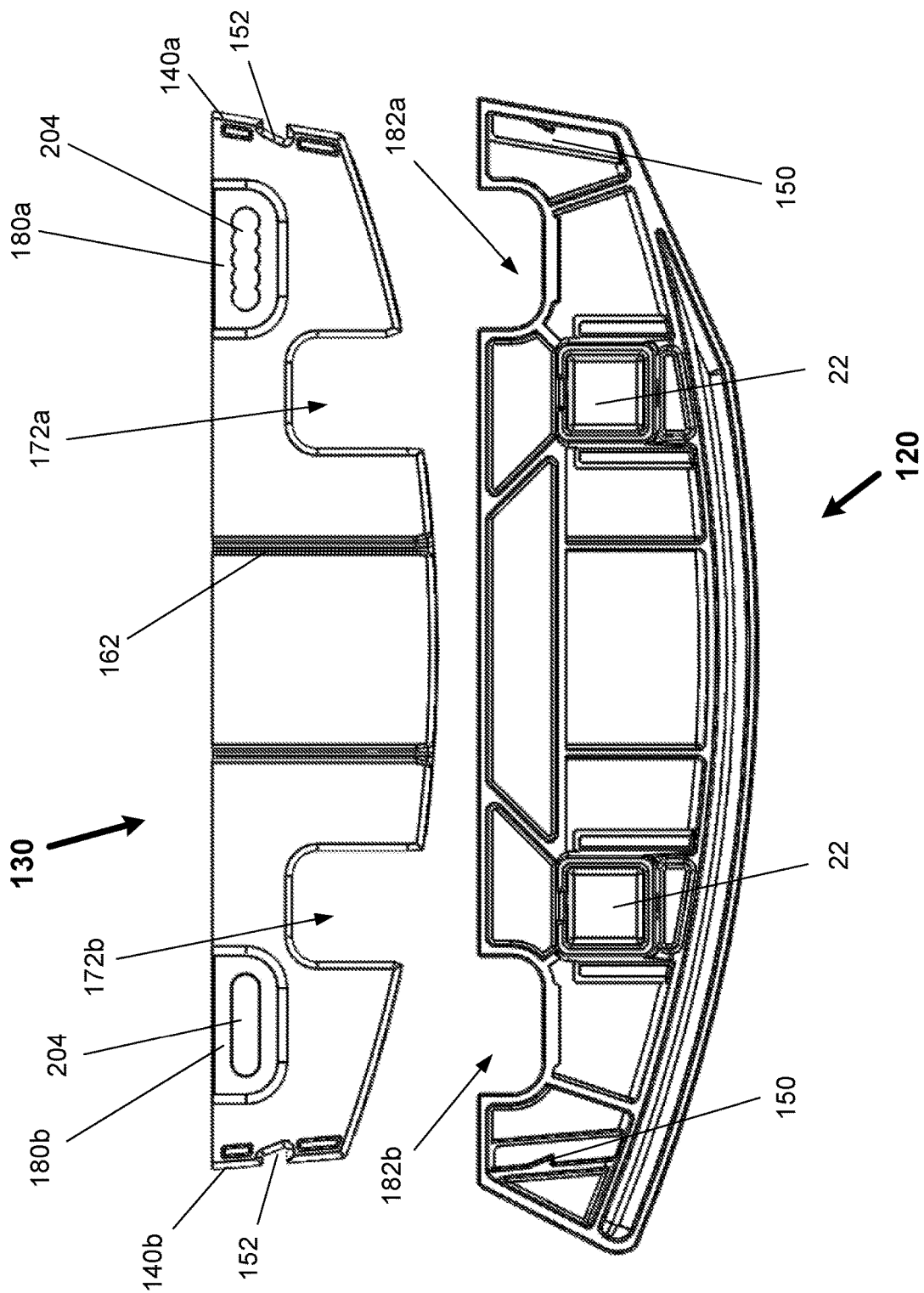
FIG. 9 is an inner side view of the assembly of FIG. 5 in a separated position
Figure 10:
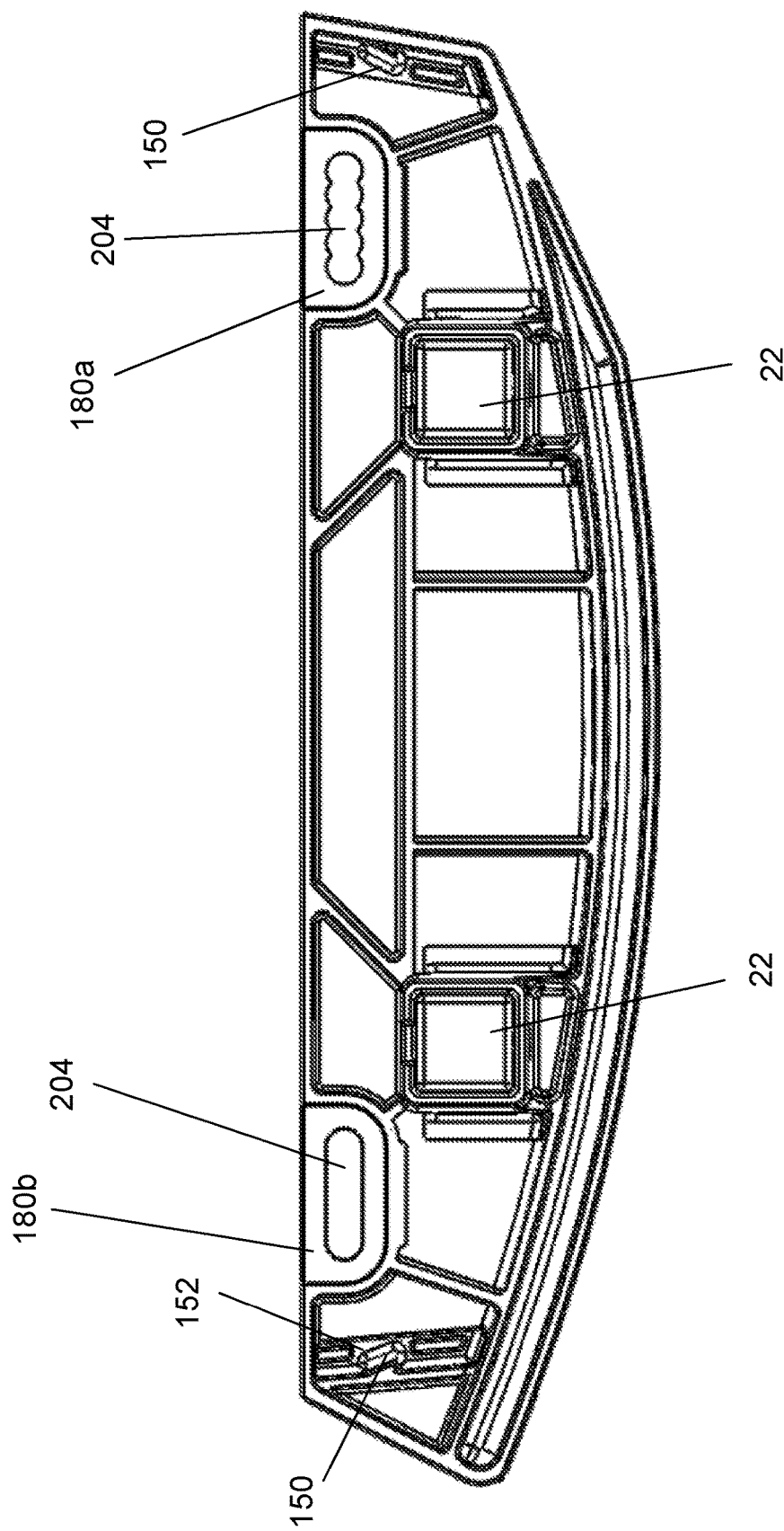
FIG. 10 is an inner side view of the assembly of FIG. 5 in a connected position.
Figure 11:
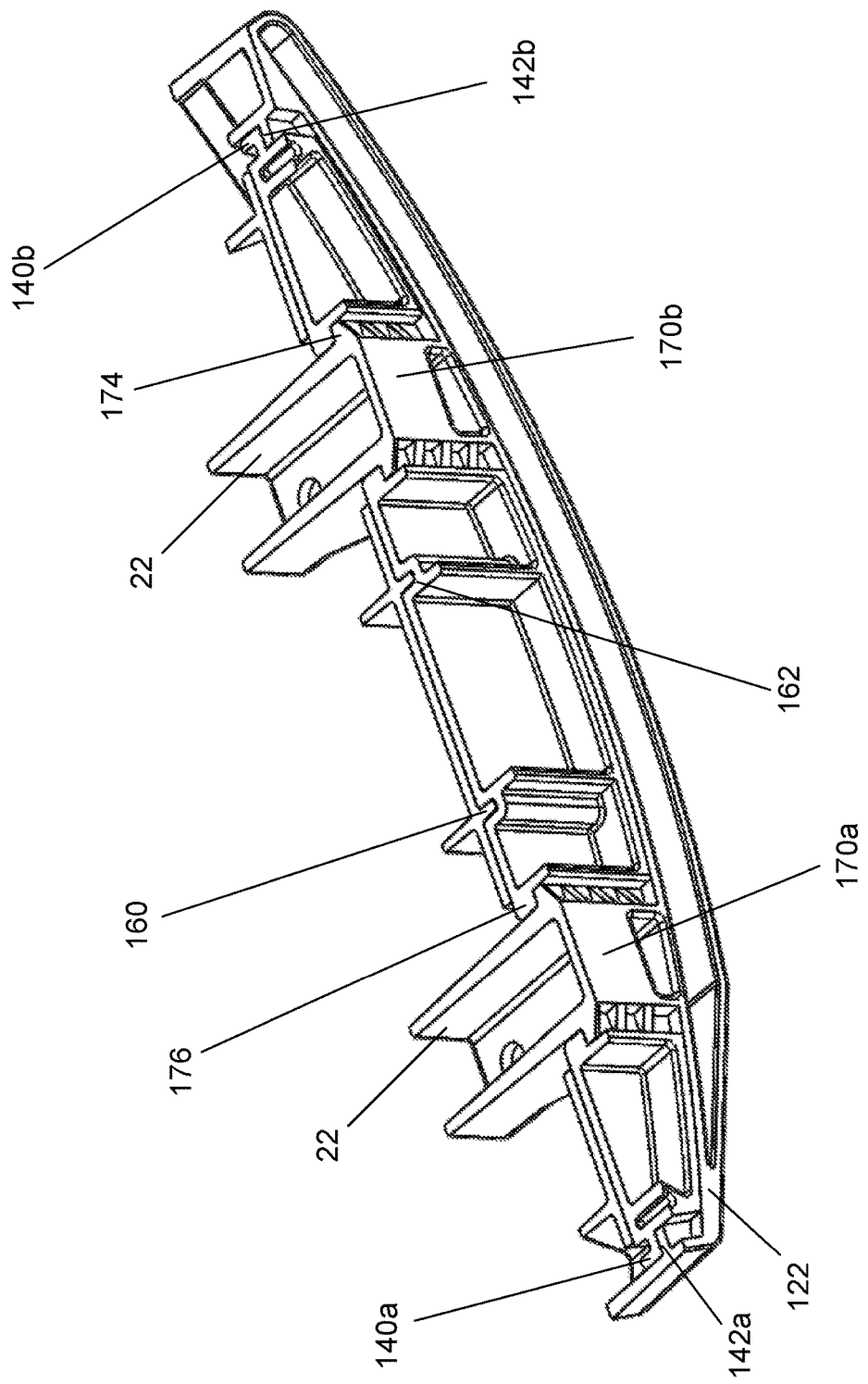
FIG. 11 is a side perspective sectional view of the connected assembly of FIG. 6 along A-A'.
Figure 12:
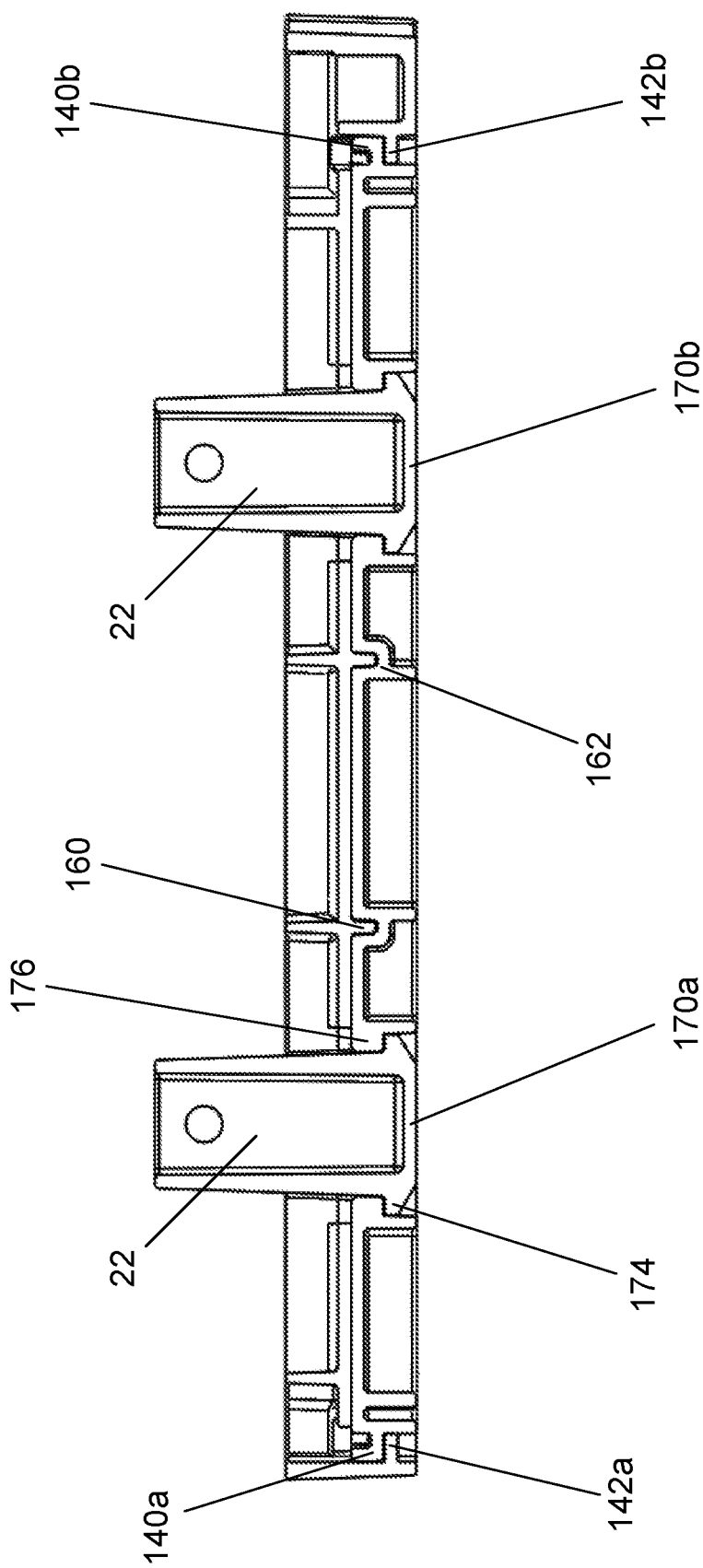
FIG. 12 is a top sectional view of FIG. 11.
Figure 13:
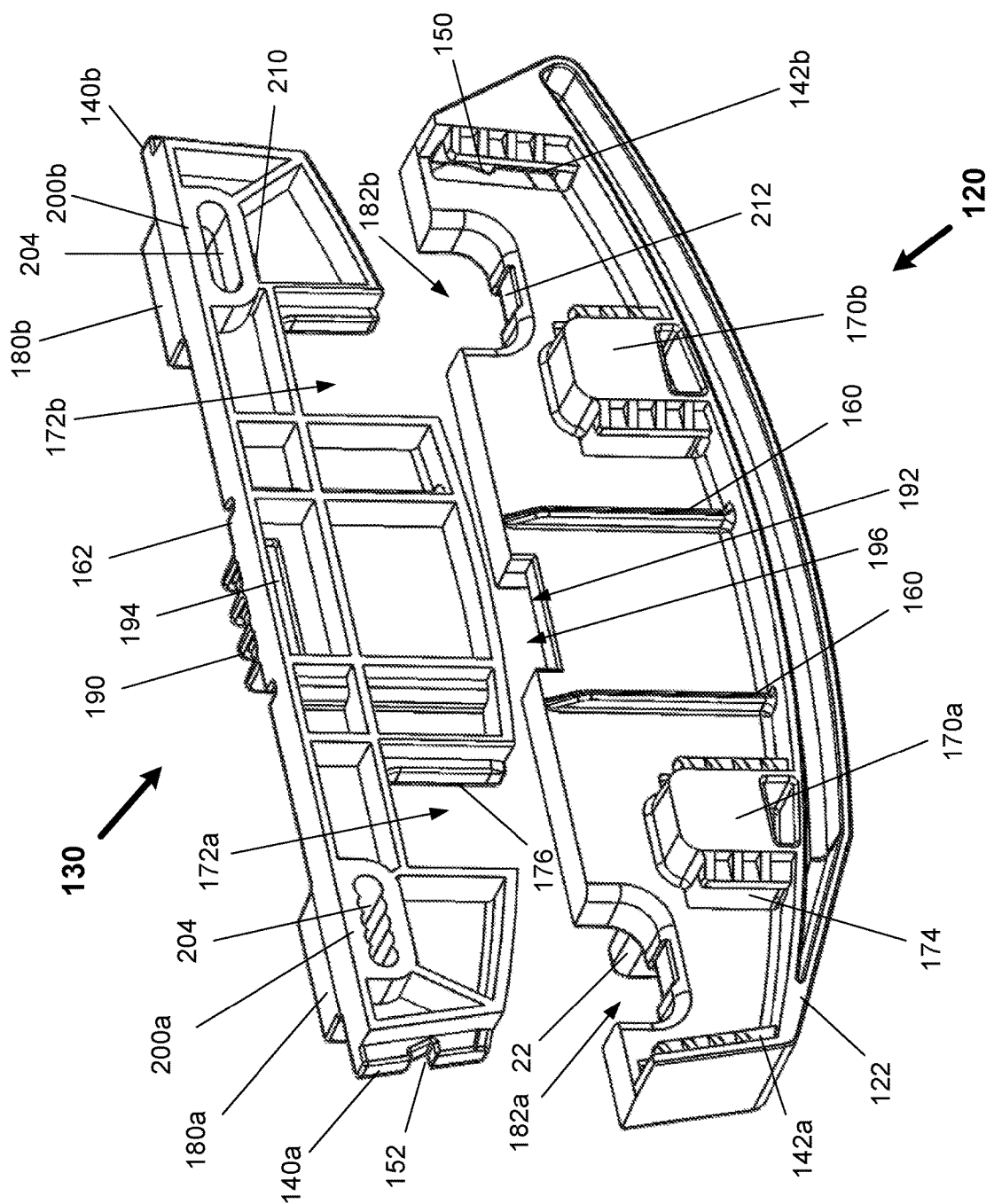
FIG. 13 is a side perspective view of another example of a two-piece cam assembly configuration in a separated position.
Figure 14:
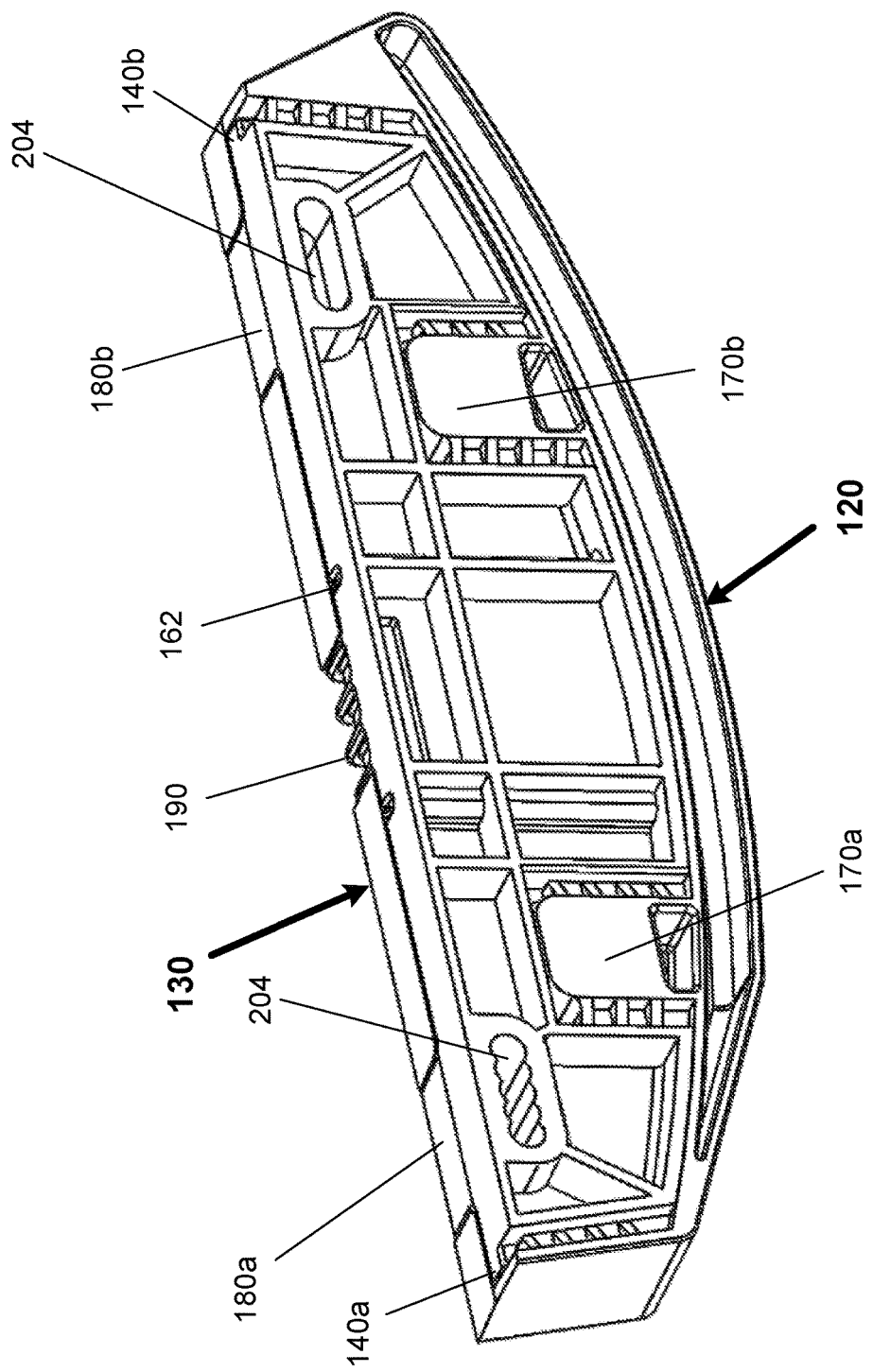
FIG. 14 is a side perspective view of the assembly of FIG. 13 in a connected position.
Figure 15:
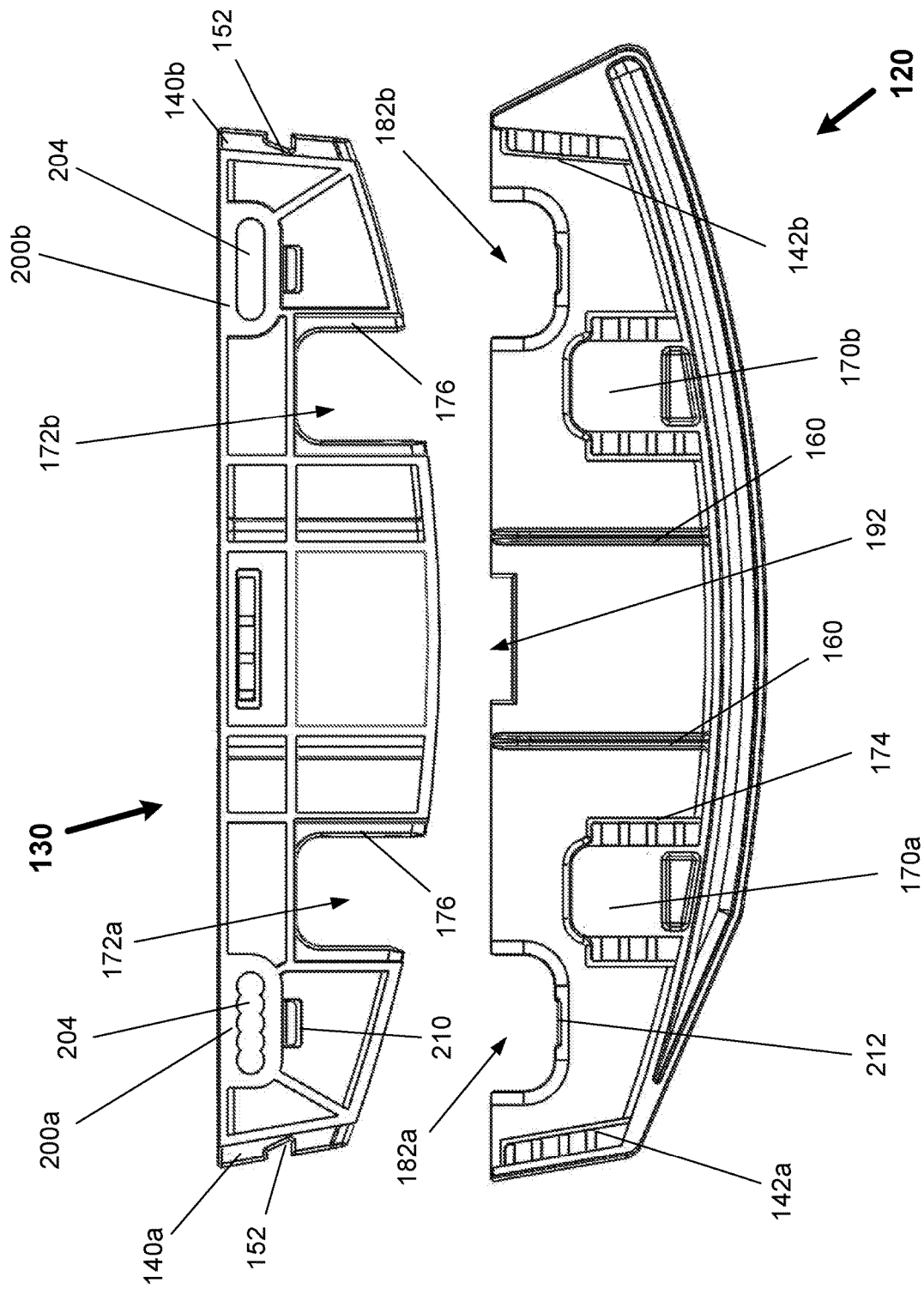
FIG. 15 is an outer side view of the assembly of FIG. 13 in a separated position
Figure 16:
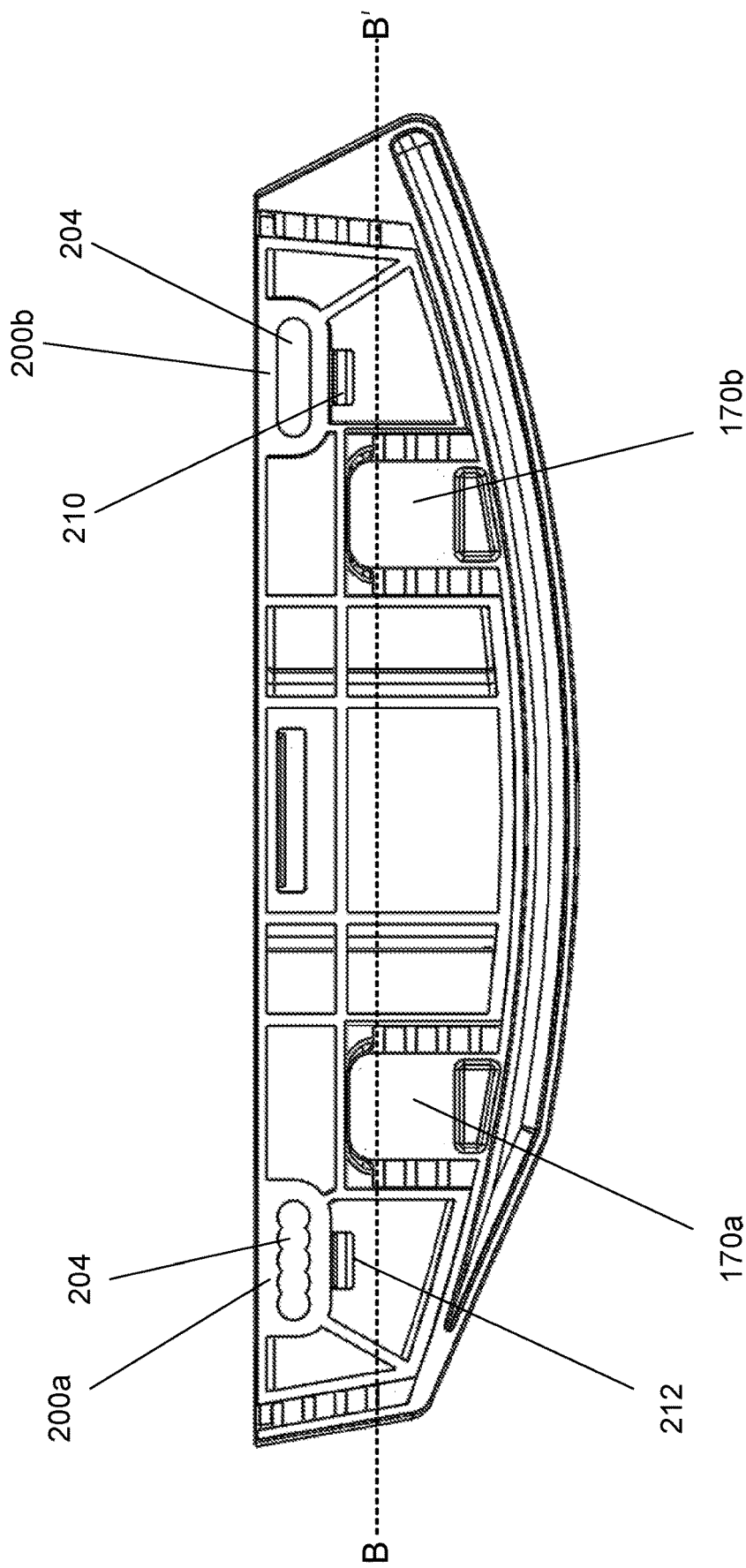
FIG. 16 is an outer side view of the assembly of FIG. 13 in a connected position.
Figure 17:
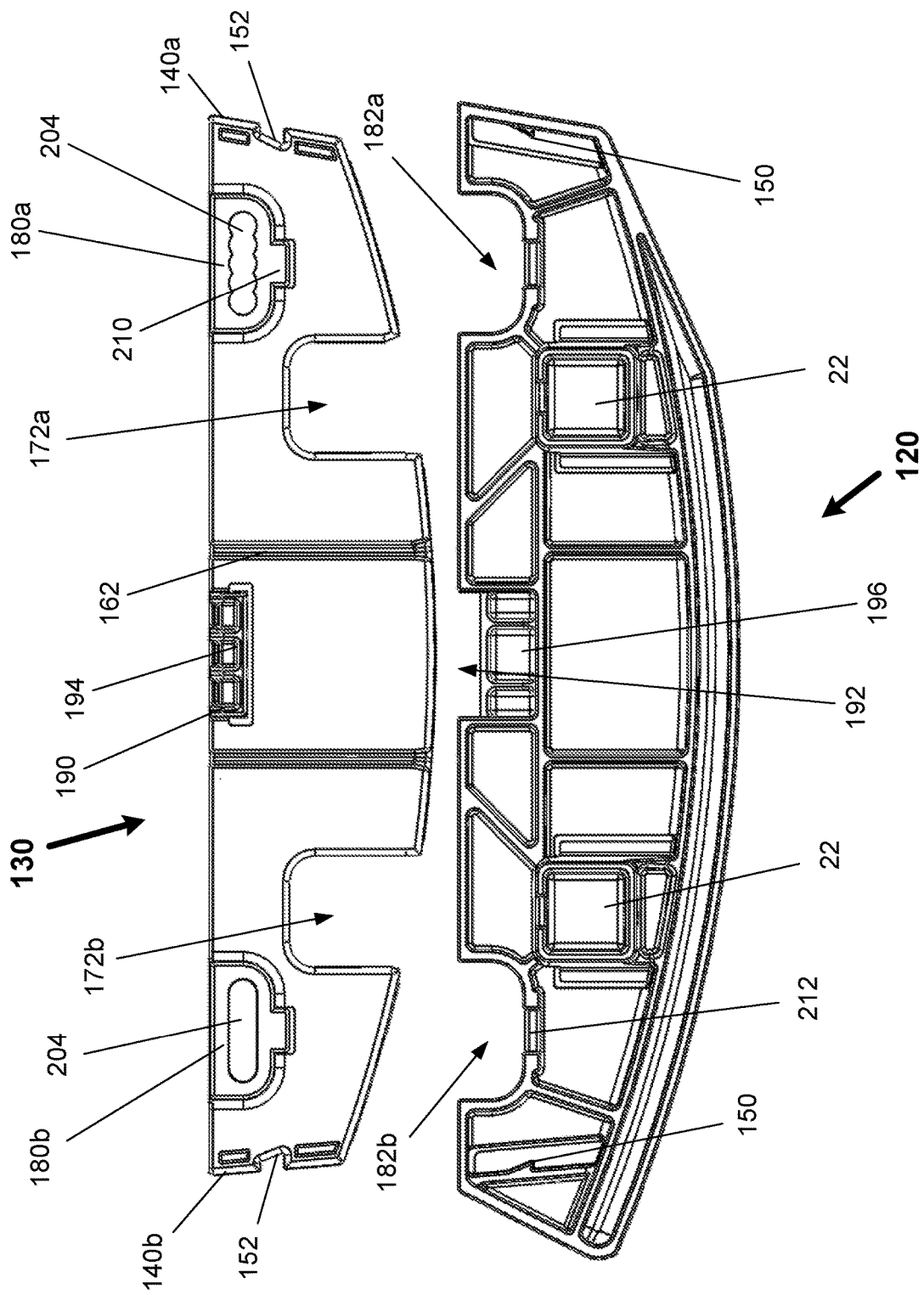
FIG. 17 is an inner side view of the assembly of FIG. 13 in a separated position
Figure 18:
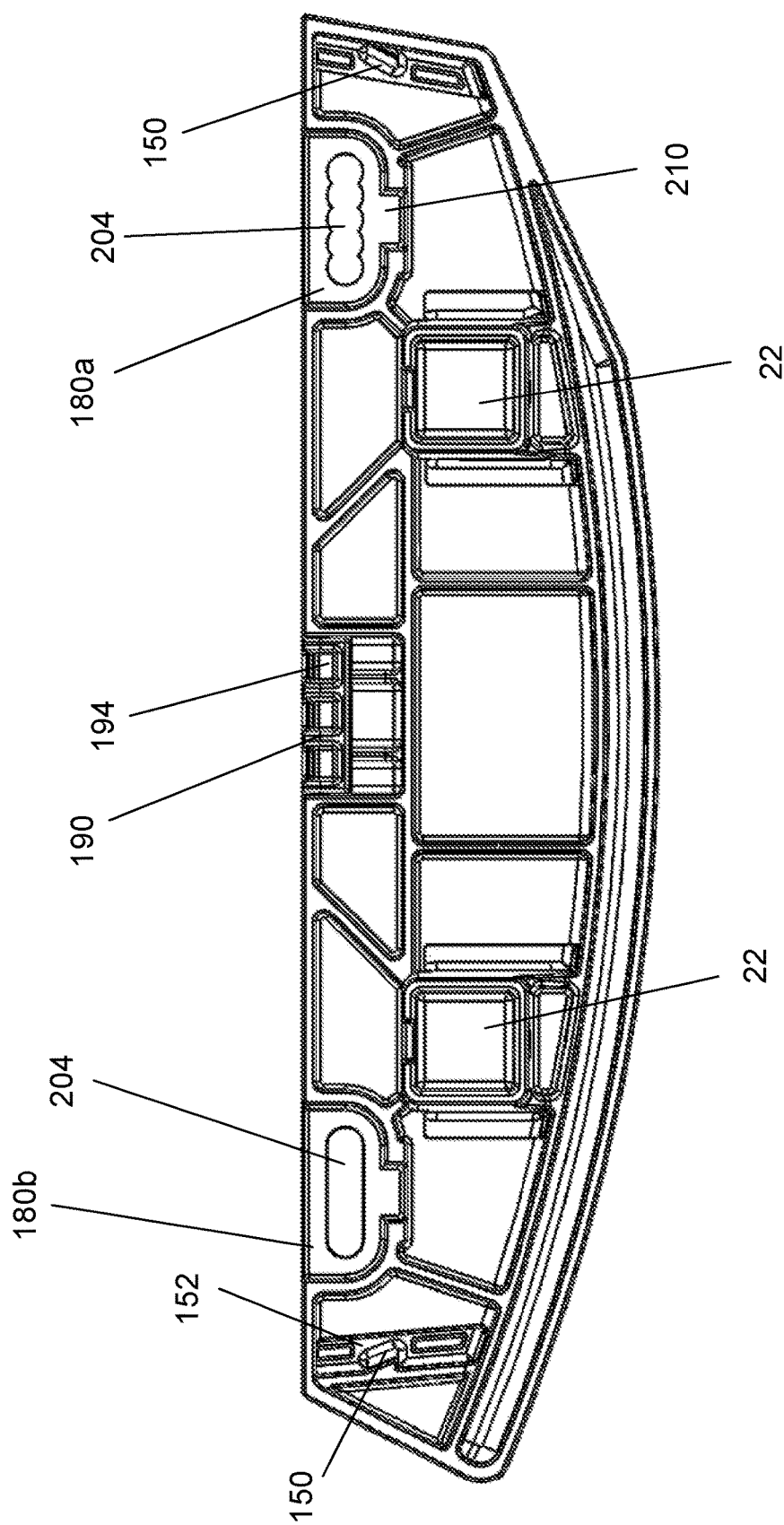
FIG. 18 is an inner side view of the assembly of FIG. 13 in a connected position.
Figure 19:
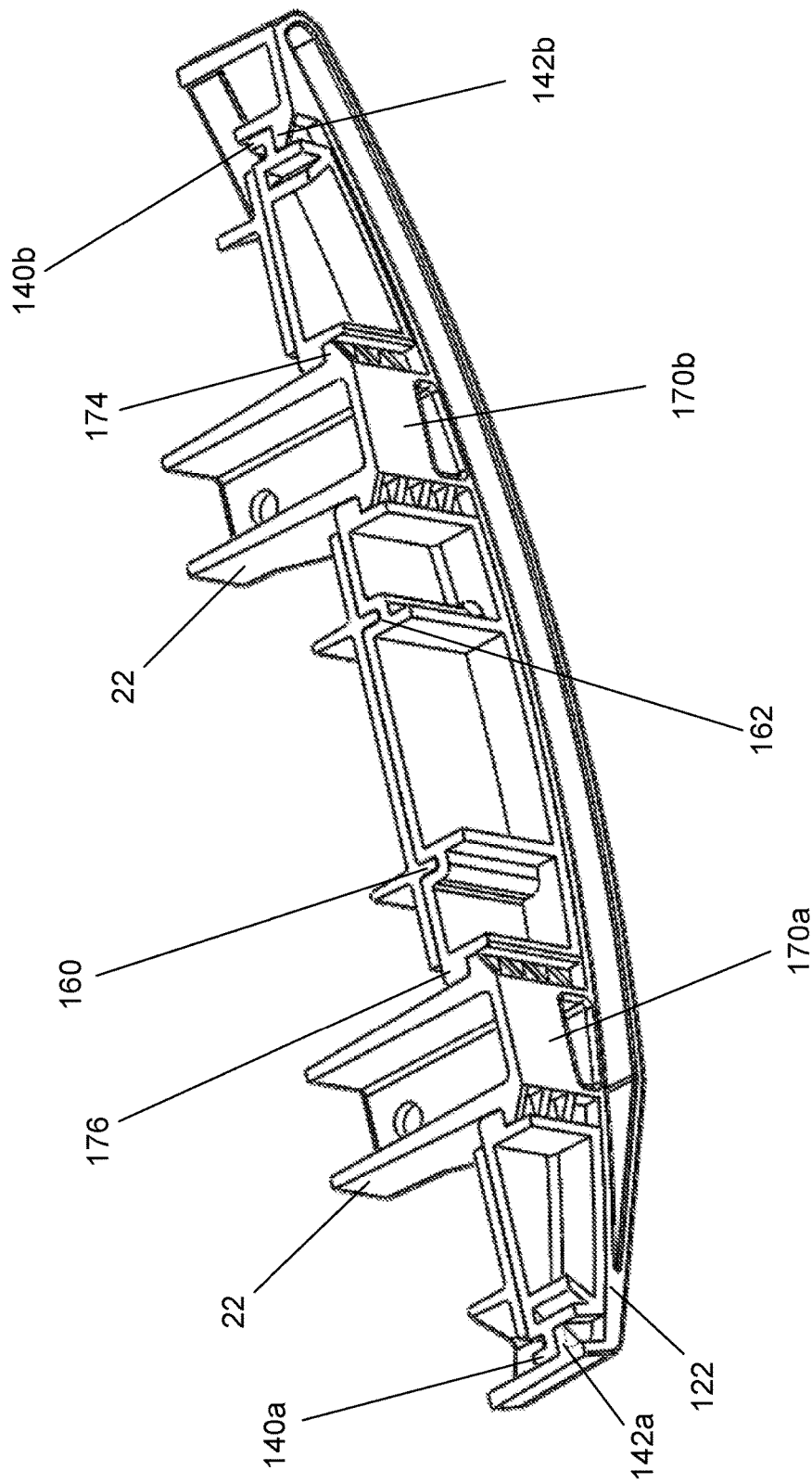
FIG. 19 is a side perspective sectional view of the connected assembly of FIG. 14 along B-B'.
Figure 20:
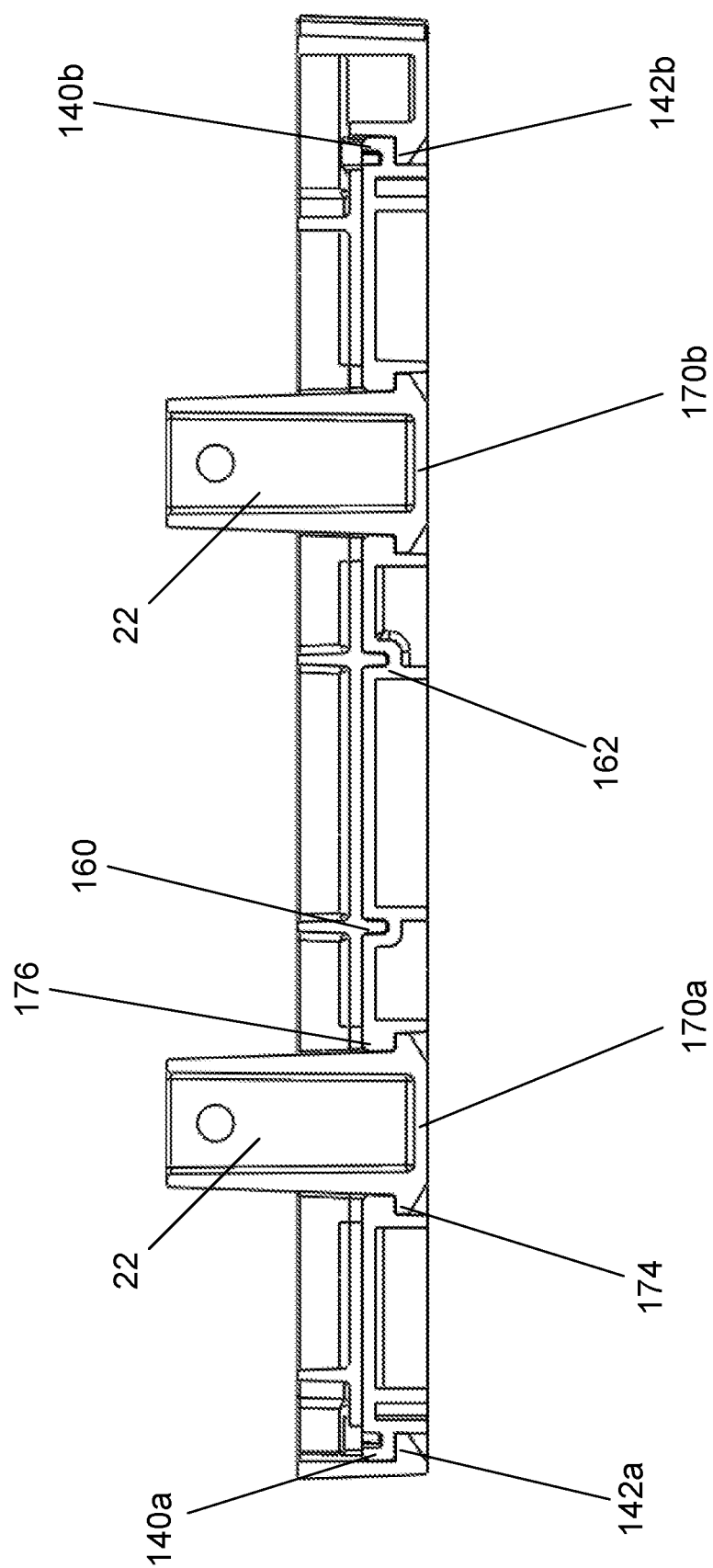
FIG. 20 is a top sectional view of FIG. 19.
Figure 21:
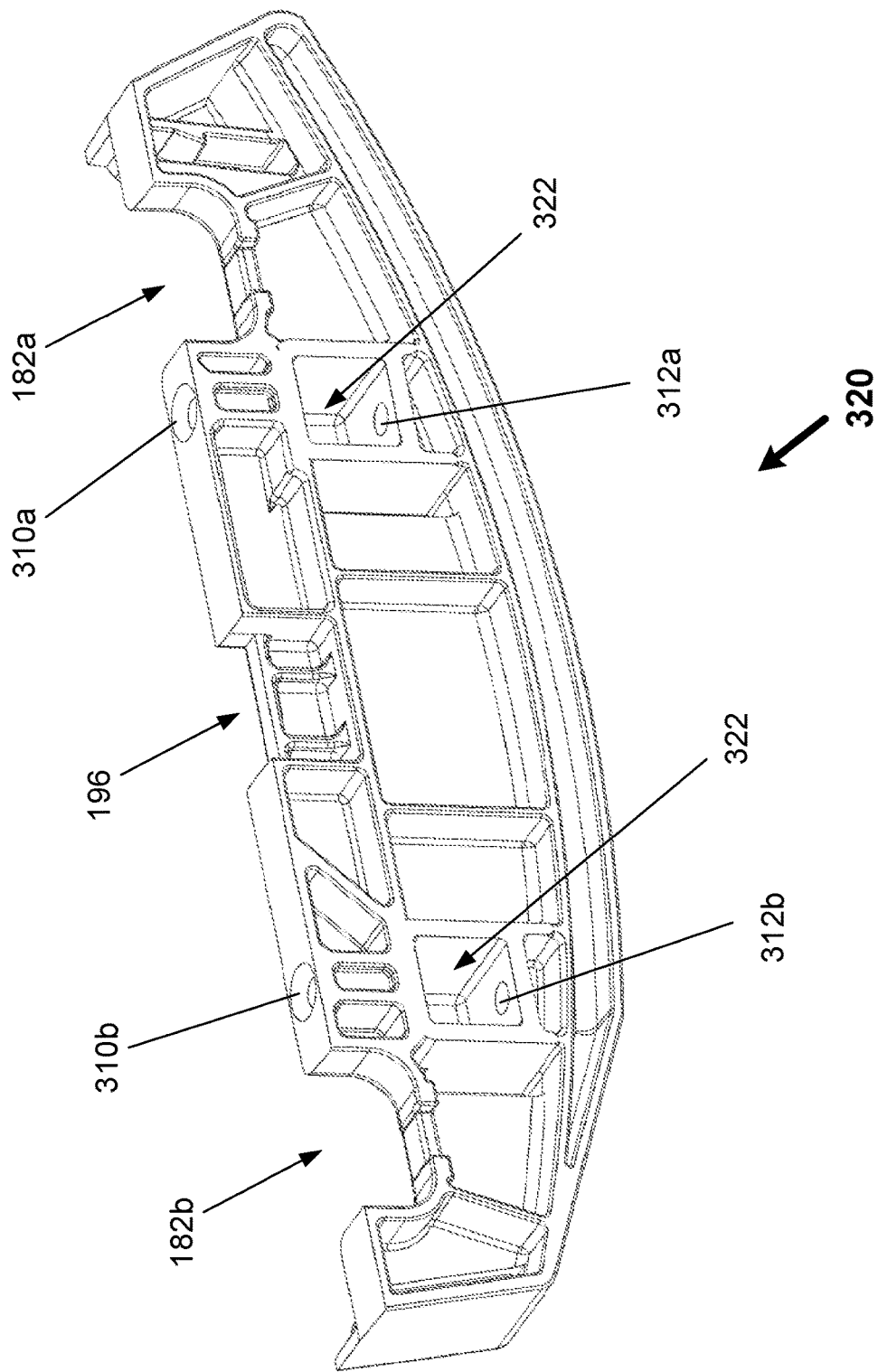
FIG. 21 is an inner side perspective view of another example of a lower or receiving cam piece from a two-piece cam assembly configuration.
Figure 22:
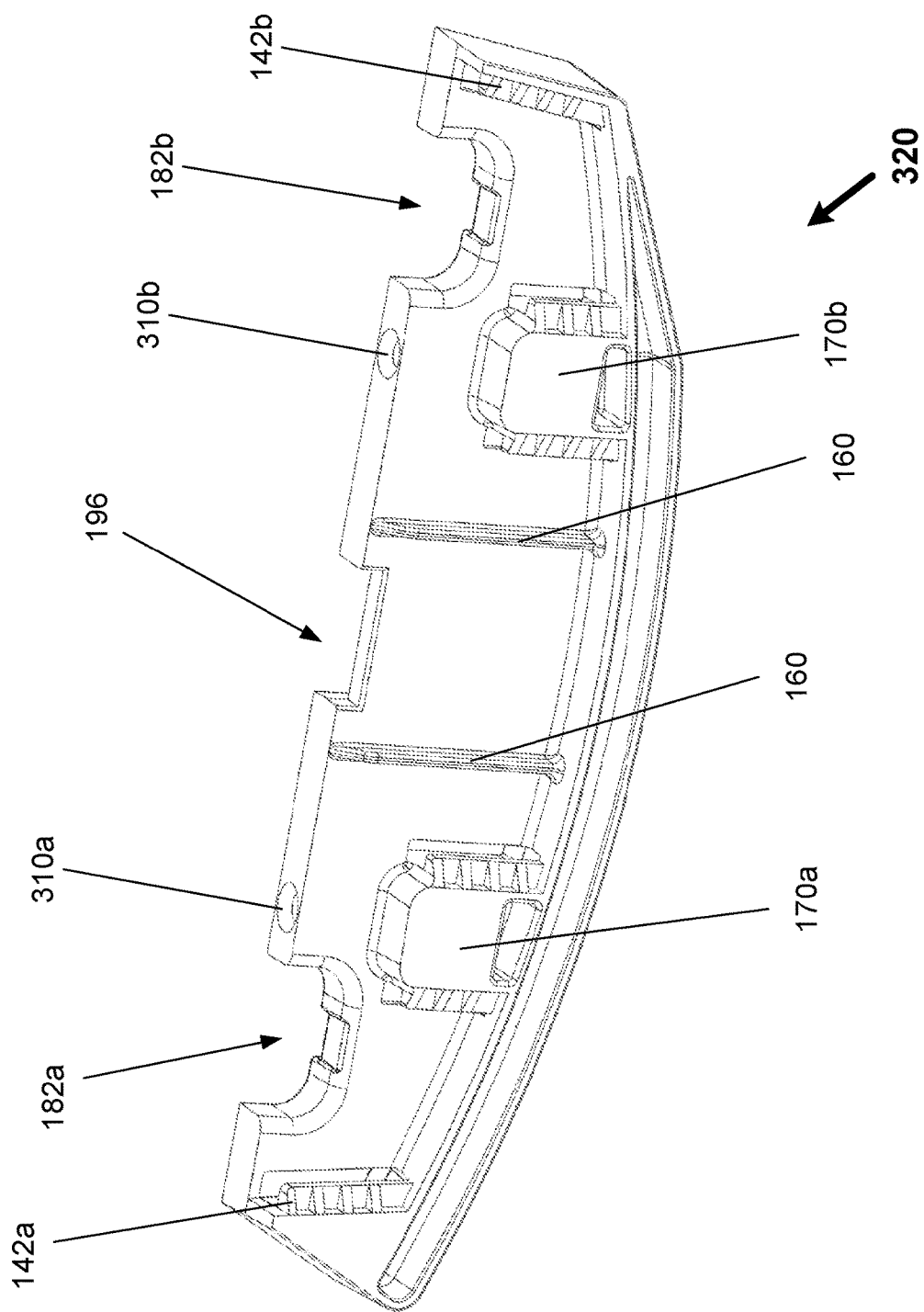
FIG. 22 is an outer side perspective view of the cam piece of FIG. 21.
Figure 23:
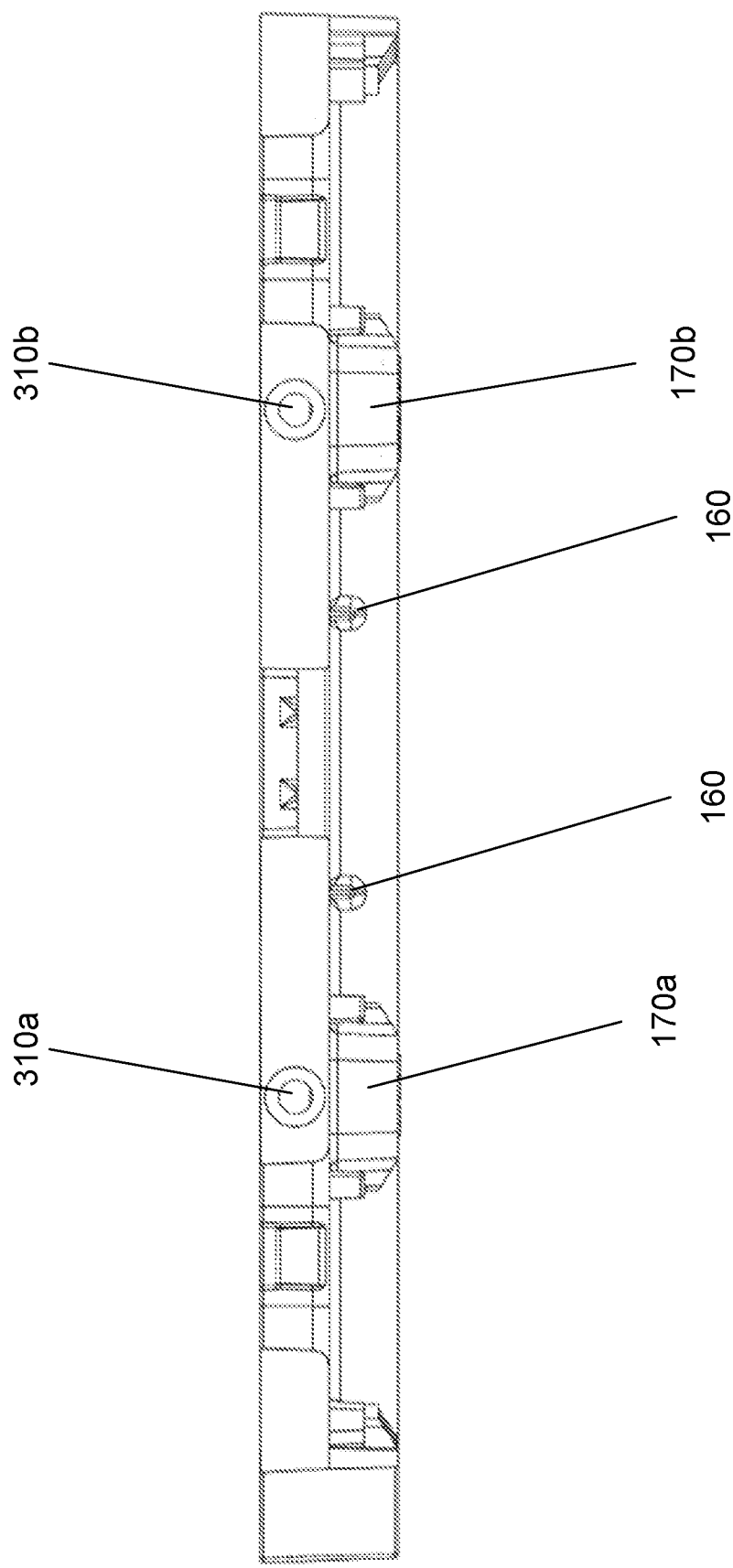
FIG. 23 is a top view of the cam piece of FIG. 21.
Figure 24:
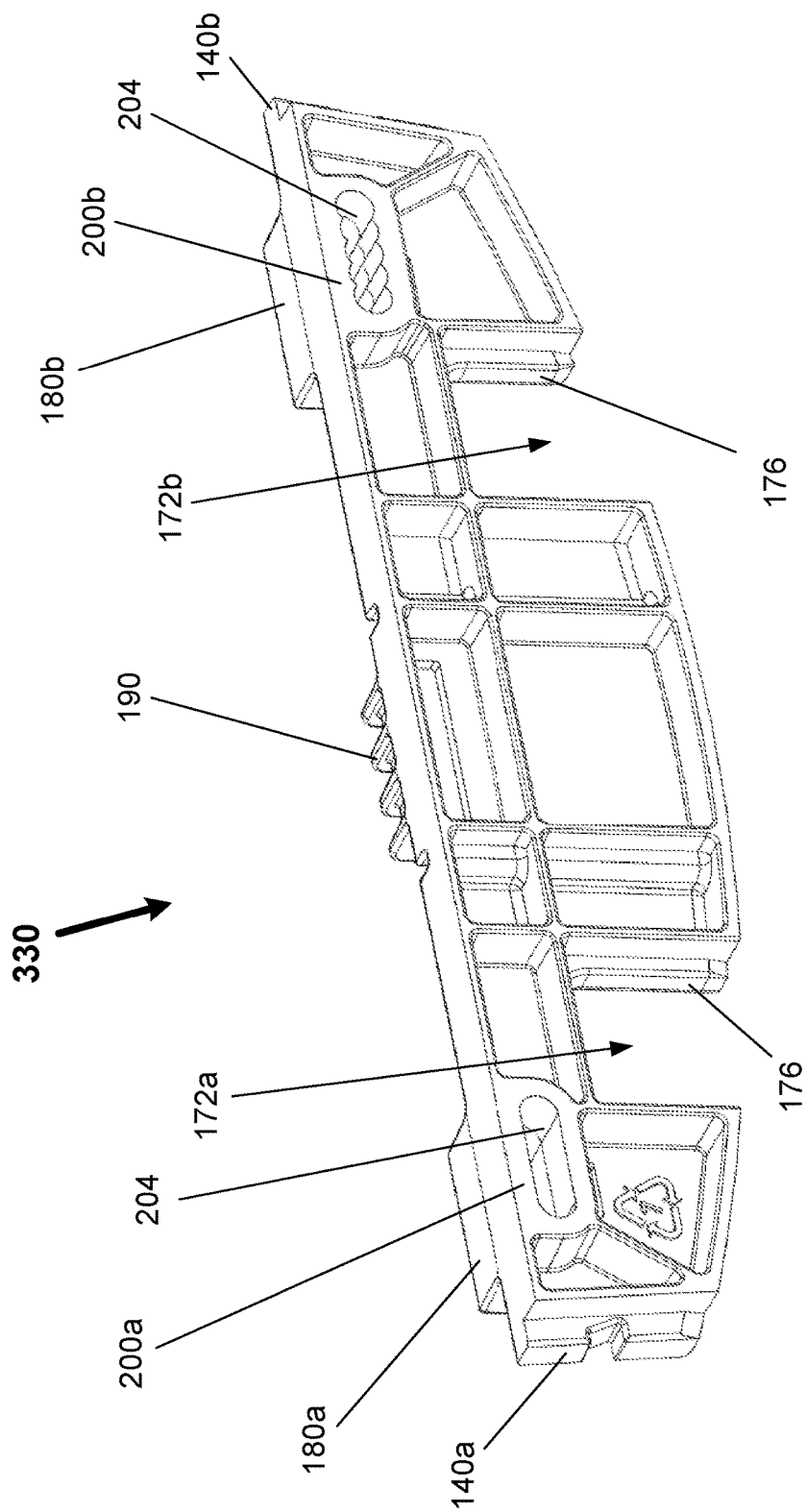
FIG. 24 is an outer side perspective view of another example of an upper cam piece from a two-piece cam assembly configuration with the lower cam piece of FIG. 21.
Figure 25:
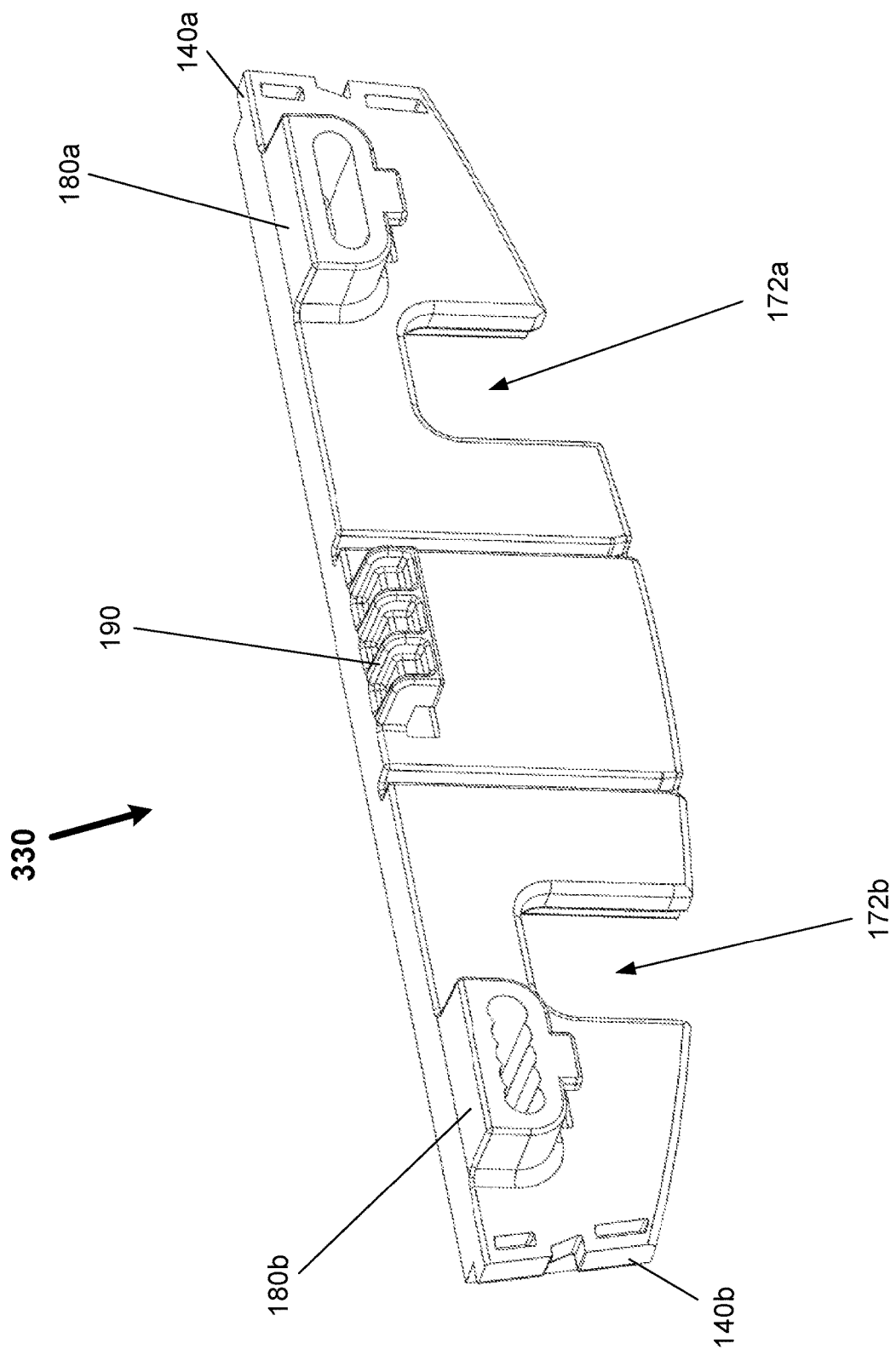
FIG. 25 is an inner side perspective view of the cam piece of FIG. 24.
Figure 26:
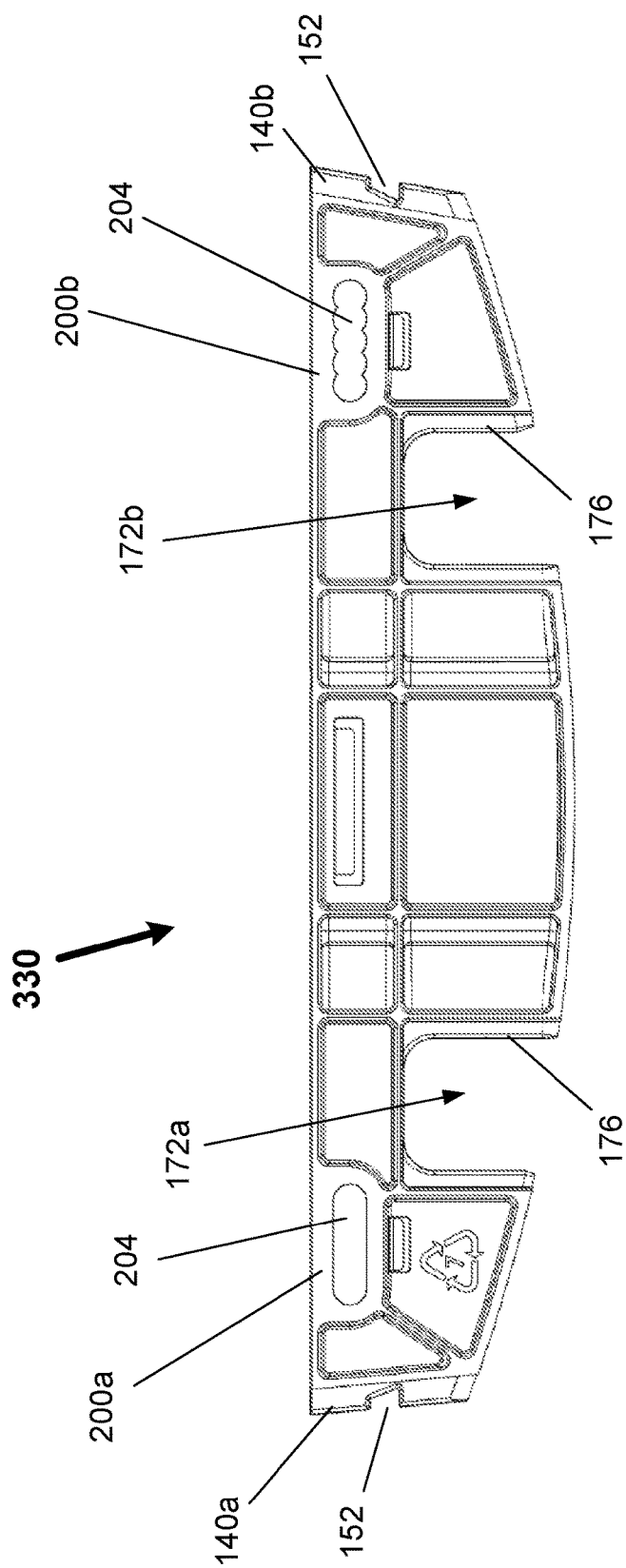
FIG. 26 is an outer side view of the cam piece of FIG. 24.
Figure 27:
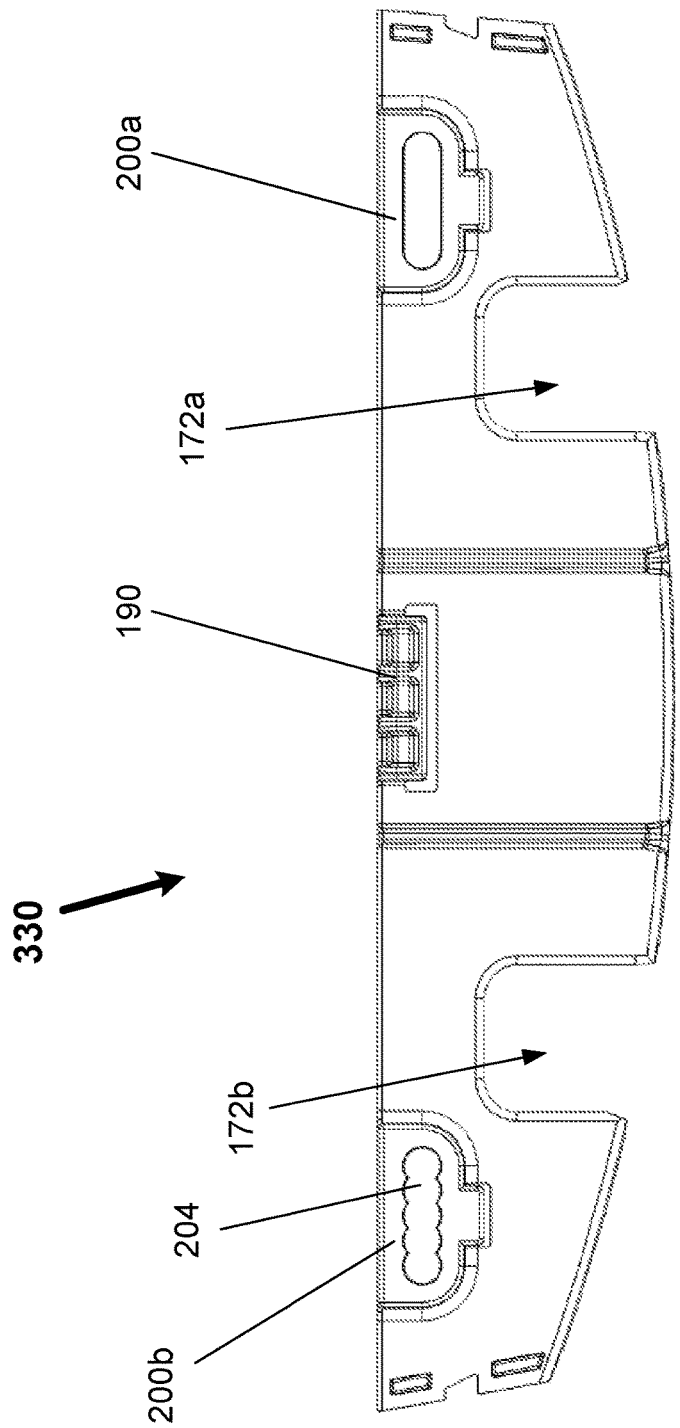
FIG. 27 is an inner side view of the cam piece of FIG. 24.
Figure 28:
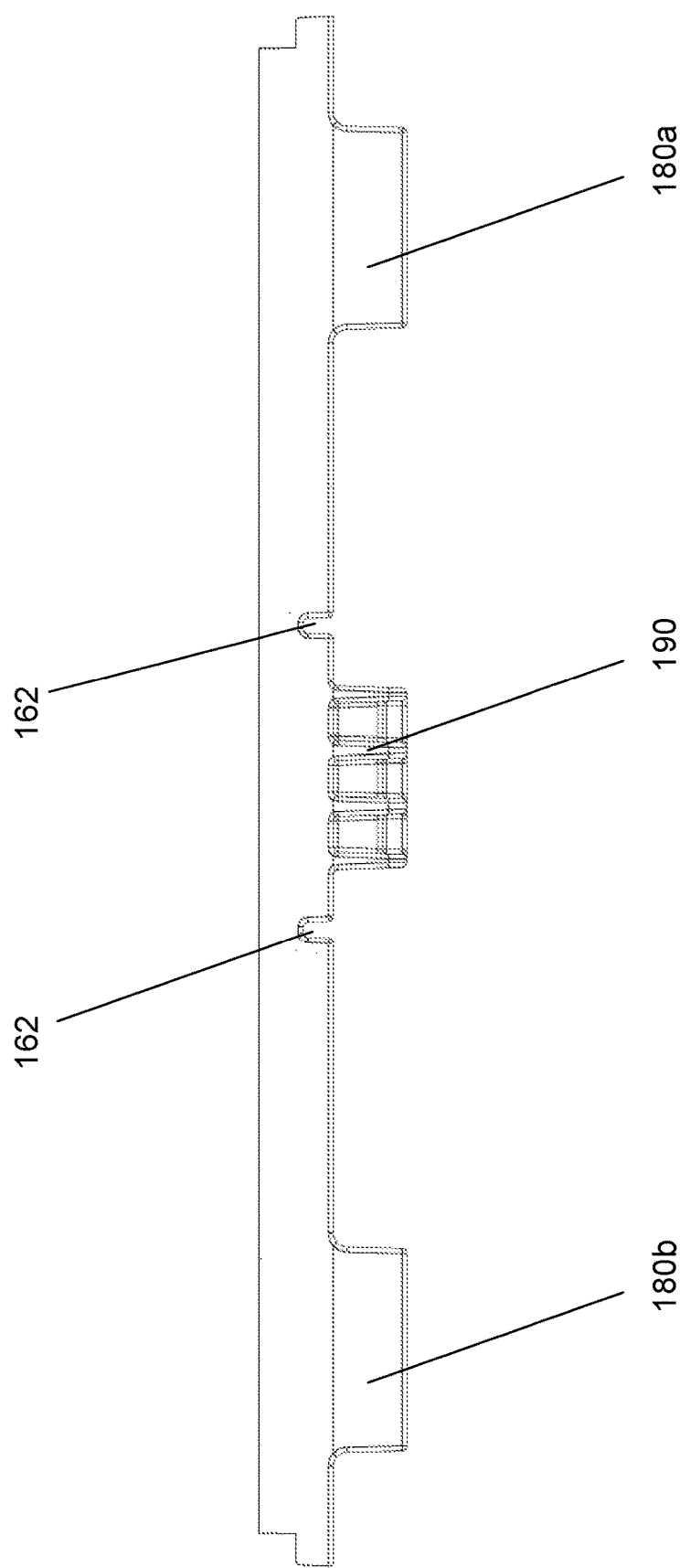
FIG. 28 is a top view of the cam piece of FIG. 24.
Figure 29:
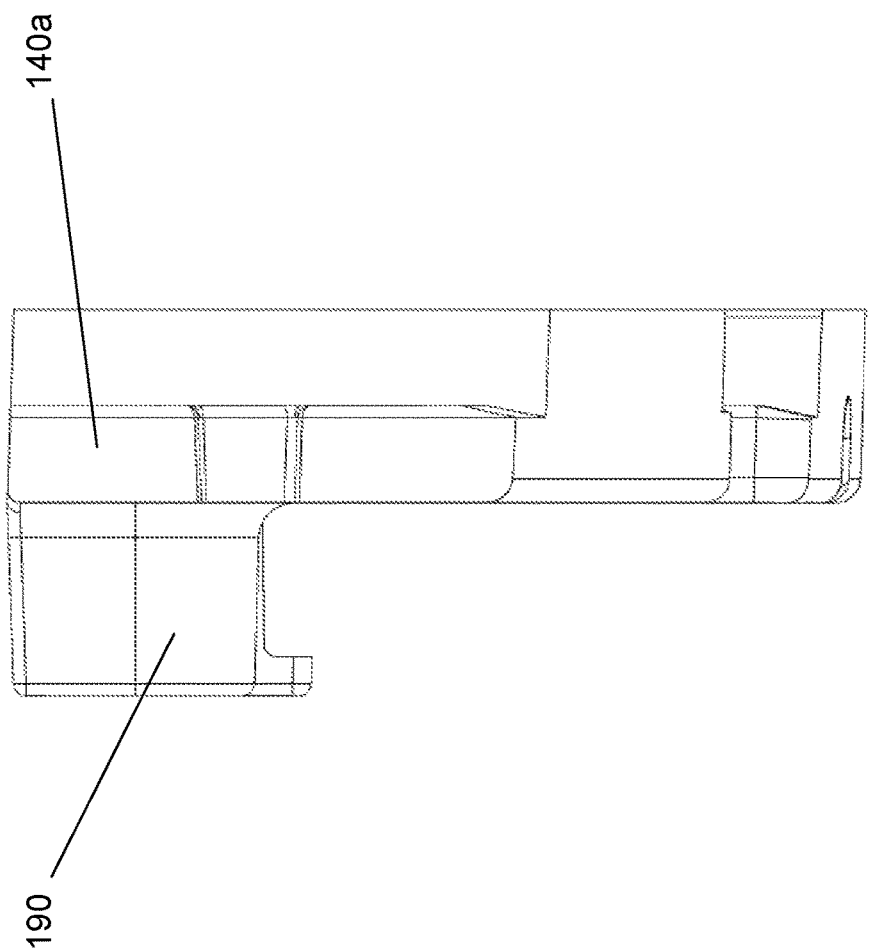
FIG. 29 is an end view of the cam piece of FIG. 24.

In various exemplary embodiments, the present invention relates to a multi-piece cam assembly for furniture. The figures are demonstrative and the invention contemplates multiple configurations including, but not limited to, two, three, four, and five cam component systems.

As generally understood, ready to assemble furniture is constructed such that an ordinarily skilled consumer can assemble the furniture. Reclining mechanisms are typically exceedingly complex and furthermore locking mechanisms are often excluded from ready to assemble furniture products.

In one embodiment, the two-piece cam is suitable for assembling a furniture base to the seat box portion of furniture. It is further contemplated that the present invention is suitable for connection of reclining mechanisms to a base in ready to assemble furniture. Reclining furniture is without limitation and includes, but is not limited to, a rocker, glider, swivel, swivel rocker, swivel glider, power variations of all of the above, sleepers, or any piece of furniture that utilizes reclining mechanism. However, the multi-piece cam assembly is suitable for all furniture, reclining or non-reclining, where connection is desired, such as, but not limited to, sofas, loveseats, chairs, sectional pieces, ottomans, rockers, gliders, swivels, swivel rocker, sleepers, and the like, each with their respective seat boxes and bases. The present invention allows the seat boxes and bases to be disconnected and connected in various combinations as desired, by the consumer, the retail store, or others.

In one embodiment, the two-piece cam is particularly well suited for connecting a furniture frame to a base. Although the drawings demonstrate a first cam piece as a locking cam connected to a furniture frame and a second or receiving cam piece connected to a base, the locking/receiving configurations are interchangeable.

First cam piece, configured as a receiving cam piece 20 is constructed and arranged with a locking orifice 24. Orifice 24 is constructed and arranged to interact with locking tab 34 on locking cam piece 32.

Receiving cam piece 20 has formed thereon a horizontal support receiver 22 which is constructed and arranged to receive horizontal supports 36 of the present invention. In one embodiment, as seen in FIG. 1A, receiving cam piece 20 is constructed arranged with a curved lower surface 26 that interacts with the upper surface 28 of furniture base 30. In another embodiment, as seen in FIG. 1B, receiving cam piece 20 is flat and secured to base 30. In the latter embodiment, the cam pieces may be referred to as connector pieces, i.e., receiving connector piece 20 and locking connector piece 32, which combine to form a connector.

The locking cam piece 32 of the present invention is constructed and arranged to affix to the seat box or scissor/main assembly of a reclining mechanism of a piece of furniture. In one embodiment, locking cam piece 32 is affixed to the seat box. In another embodiment, the seat box frame or recliner frame is formed with a cam portion integral therewith. Since locking cam piece 32 is affixed to the underside of an article of furniture it is positioned above receiving cam piece 20 whereby locking tab 34 interacts with locking tab 24 in order to removably interconnect locking cam piece 32 with receiving cam piece 20.

Either or both of the cam pieces can in turn be provided in two or more separate sub-pieces. For example, in the embodiment of FIG. 1C, receiving cam pieces 20 are provided in pairs. However, locking cam pieces may also be provided in pairs, and either may be provided in multiple sub-pieces.

In use, receiving cam piece 20 is positioned over a prepared upper surface 28 of furniture base 30. When locking cam piece 32 is positioned and locked onto receiving cam piece 20 to form a cam, the article of furniture attached thereto will be able to rock along base 30. Base 30 is constructed and arranged to have two main base portions each being 30 that are interconnected by transverse supports 38. Cam piece 20 has receiving socket 42 configured to mate with positioning tab 40 of locking cam piece 32.

In one embodiment the invention is a mechanism for a piece of furniture comprising: two or more locking cam pieces, constructed and arranged with at least one locking mechanism on each cam piece; two or more receiving cam pieces, said receiving cam pieces are constructed and arranged to receive said locking mechanism, said interconnected cam pieces are configured to be used in reclining furniture and sleepers to include, but not limited to, rockers, gliders, swivels, swivel rockers, swivel gliders, twin sleepers, full sleepers, queen sleepers, king sleepers. In addition, this mechanism assembly covers power reclining variations.

Although a particular embodiment is demonstrated, the multi-piece cam is contemplated to connect and disconnect in a male-female interlock arrangement. The multi-piece cam represents a significant and unforeseen improvement in furniture design and construction by providing a construction element that improves ease of assembly and disassembly. The multi-piece cam assembly is suitable not only for rocking, reclining, and gliding assemblies, but for all furniture in which there is the attachment of a mechanism to a frame base. The multi cam configurations provide additional benefit relating to simplification of the assembly process.

FIGS. 5-20 show additional exemplary embodiments of a multi-piece cam assembly, comprising a receiving (i.e., a first or lower) cam piece 120 and a locking (i.e., a second or upper) cam piece 130. In this embodiment, the interlocks, 140a, b, 142a, b, are positioned at one or both ends of the cam pieces, thereby providing enhanced stability when the cam pieces are locked together. One or more positioning elements, as described below, also may be used to provide assistance in assembly and overall stability and strength of the cam pieces when locked together to form the multi-piece cam.

An end interlock mechanism comprises one or more end tabs 140a, b extending from the end or ends of a cam piece, and a corresponding slot or groove 142 a, b, with or without walls or tabs of its own, on the inside of the end or ends of the other cam piece, the slot or groove 142*a*, *b* adapted to receive the corresponding one or more end tabs 140*a*, *b*. A locking tab or tabs 150 in the end interlock mechanism on one cam piece engages a corresponding hole, opening, slot, groove or tab 152 in the end interlock mechanism on the other cam piece to removably secure the one or more end tabs 140*a*, *b* within the corresponding slot or groove 142*a*, *b*. To separate the cam pieces, a tool or instrument, such as, but not limited to, a screw-driver, may be inserted into an opening in the end interlock mechanism to release the locking tab or tabs 150. In several embodiments, the end interlock mechanisms also serve as positioning elements in addition to locking or connection elements.

While FIG. 5 shows the end tabs 140*a*, *b* on the upper or locking cam piece 130, and the receiving slots or grooves 142*a*, *b* on the lower or receiving cam piece 120, it should be noted that one or both end tabs may located on the lower or receiving cam piece, and the corresponding slot or groove located on the upper or locking cam piece. Similarly, the locking tabs 150 may be located on either the lower or receiving cam piece or the upper or locking cam piece, with the corresponding hole, opening, slot, groove or tab located on the other cam piece element.

FIGS. 5-20 further show a plurality of positioning elements that may be used to assist in assembly of the multi-piece cam. One or more vertical ribs, ridges or rectilinear elements 160 may be located along a side of a cam piece, extending to the bottom or top, respectively, of the cam piece, with a corresponding slot, groove or channel 162 on a corresponding side of the other cam piece element provided to receive the corresponding vertical rib, ridge or rectilinear element 160. The top of the vertical ribs, ridges or rectilinear elements may be angled 166 for ease of insertion. As seen in FIG. 5, the vertical rib, ridge or rectilinear extends to the bottom 122 of the lower cam piece. The bottom of the lower cam piece may be solid, or hollow in sections or parts to reduce weight.

Similarly, one or more rectilinear elements or blocks, 170*a*, *b*, 180*a*, *b*, 190, may be positioned along a side of the receiving or locking cam (and may be positioned along or near the top of the particular cam element), with a corresponding receiving hole or slot, 172*a*, *b*, 182*a*, *b*, 192, located along or in a corresponding side of the other cam piece element. These elements may be of substantial size, and thus provide additional support and strength to the cam when assembled. For example, the sides of rectilinear elements 170*a*, *b* may comprise channels 174 adapted to receive corresponding tabs or ribs 176 along the inside of the corresponding receiving slot or hole, 172*a*, *b*. Further, one or more of these elements may incorporate or include one or more of the horizontal support receivers 22.

In several embodiments, a central positioning element 190, 192 is provided to provide additional strength and security for the assembled cam pieces. Positioning element 190 may be a simple block or flat extension, or may be L-shaped in cross-section, with a outermost element 194 that latches over or slides into a groove or slot 196 in the corresponding positioning element. This positioning element also may serve as an additional central interlock mechanism as described above, providing three or more interlock points in conjunction with the two In several embodiments, one or more horizontal attachment tabs or elements 200*a*, *b* are located along or near the top of the upper cam piece 130, the horizontal attachment tabs or elements comprising bolt holes or slots 204 for attaching one or more mechanisms or furniture components to the cam. piece. The horizontal attachment tabs 200*a*, *b* also may comprise or be an extension of a positioning element, such as blocks 180*a*, *b*, as described above, and fit within corresponding grooves or channels 182*a*, *b* in the lower cam piece 120. In the embodiment shown in FIGS. 13-20, the block positioning elements 180*a*, *b* and corresponding grooves or channels 182*a*, *b* also may comprise an additional tab 210 and slot or groove 212 on respective elements to help position and secure the respective cam pieces when connected.

As seen in several of the figures, when assembled or connected, sections of the top of the lower cam piece 120 are level with the top of the of the upper cam piece 130. Due to the nature and placement of the positioning elements, however, in several sections the top of the upper cam piece 130 extends over the corresponding top section of the lower cam piece 120. The connected cam assembly thus provides multi-axis strength and durability, with resistance to movement of the cam pieces with respect to each other after connection, which can lead to breakdown or failure of one or more of the cam pieces during use.

FIGS. 21-29 show additional exemplary embodiments of a flat-sided multi-piece cam assembly, comprising a receiving (i.e., a first or lower) cam piece 320 and a locking (i.e., a second or upper) cam piece 230. In this embodiment, the interlocks, 140*a*, *b*, 142*a*, *b*, are positioned at one or both ends of the cam pieces as described above, thereby providing enhanced stability when the cam pieces are locked together. One or more positioning elements, as described above, also may be used to provide assistance in assembly and overall stability and strength of the cam pieces when locked together to form the multi-piece cam.

In this embodiment, there are no elements of either cam piece extending outward from the sides of either cam piece, individually or in a conjoined configuration (i.e., the sides are "flat"). Horizontal supports are inserted into one or more cavities, orifices or openings 322 in the side of a cam piece, and which may extend through some or all of the width of the cam piece. The configuration has the advantage of a simpler efficient design without exposing any extended elements to damage or breakage during shipping or assembly.

Fastening means, such as a hole 312*a*, *b*, on the interior of the orifice 322 may be used to receive a spring-based tab or extension element on the horizontal support to hold the horizontal support securely in place. The fastening means can be released by pushing the tab or extension down or inwards. In other embodiments, the horizontal support may comprise a hole extending therethrough proximate to the end, and configured to align with matching holes 310*a*, *b* extending vertically through the cam piece and opening into the corresponding orifices 322. A screw or bolt may then be inserted into the holes 310*a*, *b* and through the corresponding holes in the horizontal support when inserted into the orifice.

The embodiments shown in FIGS. 5-29 also possess a significant advantage in shipping of the respective furniture pieces or components with the respective cam pieces attached, as it has no positioning elements extending outward from the top or bottom of the respective cam pieces or components, or, in the case of FIGS. 21-29, from the sides of the respective cam pieces or components. For example, a positioning tab or element extending from the bottom of the upper or locking cam piece can be damaged or bent during shipping, thereby interfering or preventing the proper functioning of the cam elements and assembly.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention. Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A mechanism for assembling and connecting a furniture base to a furniture box, comprising:
    a first cam piece with a front end and a rear end and at least one first positioning element, said first cam piece front end configured with a first front end cam interlock, and said first cam piece rear end configured with a first rear end cam interlock;
    a second cam piece with a front end and a rear end and at least one second positioning element, said second cam piece front end configured with a second front end cam interlock, and said second cam piece rear end configured with a second rear end cam interlock;
    wherein when said first said cam piece is moved toward said second cam piece in a connection direction, with said at least one first positioning element and said at least one second positioning element aligned to engage each other, said first front end cam interlock and said second front end cam interlock are aligned to mate and interlock, and said first rear end cam interlock and said second rear end cam interlock are aligned to mate and interlock;
    wherein the first cam piece and the second cam piece form a cam when connected.

2. The mechanism of claim 1, wherein said first cam piece comprises two or more first cam elements.

3. The mechanism of claim 1, wherein said second cam piece comprises two or more second cam elements.

4. The mechanism of claim 1, said at least one first positioning element comprising a pair of vertical ribs along a side of the first cam piece, and said at least one second positioning element comprising a pair of receiving channels or slots along a side of the second cam piece.

5. The mechanism of claim 1, said at least one second positioning element comprising a pair of vertical ribs along a side of the second cam piece, and said at least one first positioning element comprising a pair of receiving channels or slots along a side of the first cam piece.

6. The mechanism of claim 1, wherein said at least one first positioning element comprises one or more channels, and said at least one second positioning element comprises one or more tabs or posts adapted to slidingly engage said one or more channels.

7. The mechanism of claim 1, wherein said first cam piece is seated on a furniture base, and said second cam piece is affixed in a fixed position to a furniture box or a mechanism attached to said furniture box.

8. The mechanism of claim 1, wherein said second cam piece is seated on a furniture base, and said first cam piece is affixed in a fixed position to a furniture box or a mechanism attached to said furniture box.

9. The mechanism of claim 7, wherein said furniture base is selected from a group consisting of a recliner base, a rocker base, a glider base, a swivel base, a swivel rocker base, a swivel glider base, a twin sleeper base, a full sleeper base, a queen sleeper base, and a king sleeper base.

10. The mechanism of claim 1, wherein said first cam piece and said second cam piece are disengageable.

11. The mechanism of claim 1, wherein sections of the top of the first cam piece are level with sections of the top of the second cam piece when the first cam piece and the second cam piece are engaged.

12. The mechanism of claim 1, wherein sections of the top of one cam piece extend over corresponding sections of the other cam piece when the first cam piece and the second cam piece are engaged.

13. The mechanism of claim 1, wherein the second cam piece comprises at least two cavities or orifices with an opening in one side of the second cam piece, adapted to receive and securely hold a horizontal support tube or rod.

14. A mechanism for assembling and connecting a furniture base to a furniture box, comprising:
    a first connector piece with a front end and a rear end and at least one first positioning element, said first cam piece front end configured with a first front end connector interlock, and said first connector piece rear end configured with a first rear end connector interlock;
    a second connector piece with a front end and a rear end and at least one second positioning element, said second connector piece front end configured with a second front end connector interlock, and said second connector piece rear end configured with a second rear end connector interlock;
    wherein when said first said connector piece is moved toward said second connector piece in a connection direction, with said at least one first positioning element and said at least one second positioning element aligned to engage each other, said first front end connector interlock and said second front end connector interlock are aligned to mate and interlock, and said first rear end connector interlock and said second rear end connector interlock are aligned to mate and interlock.

* * * * *